US008849758B1

(12) United States Patent
Sivasubramanian et al.

(10) Patent No.: US 8,849,758 B1
(45) Date of Patent: Sep. 30, 2014

(54) DYNAMIC DATA SET REPLICA MANAGEMENT

(75) Inventors: Swaminathan Sivasubramanian, Seattle, WA (US); Bradley E. Marshall, Bainbridge Island, WA (US); Tate Andrew Certain, Seattle, WA (US); Nicholas J. Maniscalco, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 50 days.

(21) Appl. No.: 12/979,554

(22) Filed: Dec. 28, 2010

(51) Int. Cl.
*G06F 17/30* (2006.01)

(52) U.S. Cl.
CPC .... *G06F 17/30595* (2013.01); *G06F 17/30607* (2013.01)
USPC .......................................... 707/636; 707/655

(58) Field of Classification Search
USPC ......... 707/10, 100, 705, 655, 608, 763; 714/6
See application file for complete search history.

(56) References Cited

U.S. PATENT DOCUMENTS

| 7,024,436 | B2* | 4/2006 | Kolodner et al. | 1/1 |
| 7,089,296 | B2* | 8/2006 | Dai et al. | 709/219 |
| 7,849,180 | B2* | 12/2010 | Sawyer et al. | 709/223 |
| 7,873,619 | B1* | 1/2011 | Faibish et al. | 707/705 |
| 7,949,637 | B1* | 5/2011 | Burke | 707/655 |
| 2002/0178335 | A1* | 11/2002 | Selkirk et al. | 711/162 |
| 2006/0174157 | A1* | 8/2006 | Barrall et al. | 714/6 |
| 2007/0266037 | A1* | 11/2007 | Terry et al. | 707/100 |
| 2008/0281697 | A1* | 11/2008 | Whitehead | 705/14 |
| 2008/0281830 | A1* | 11/2008 | Sicola | 707/10 |
| 2009/0217326 | A1* | 8/2009 | Hasek | 725/87 |
| 2009/0299976 | A1* | 12/2009 | Dexter | 707/3 |
| 2010/0064292 | A1* | 3/2010 | Akutsu et al. | 718/104 |
| 2011/0119328 | A1* | 5/2011 | Simitci et al. | 709/203 |

\* cited by examiner

*Primary Examiner* — James Trujillo
*Assistant Examiner* — Thong Vu
(74) *Attorney, Agent, or Firm* — Novak Druce Connolly Bove + Quigg LLP

(57) ABSTRACT

Systems and methods dynamically manage replicas of data sets. A collection of data stores is used to redundantly store one or more replicas of one or more data sets. The replicas may be used to respond to read requests from multiple sources. Upon identification of a need to allocate storage space to a data object, space used by one or more of the replicas is allocated to the data object. Various parameters may be utilized in the selection of one or more replicas whose storage space can be allocated to the data object. The parameters may be based at least in part on characteristics of the one or more data sets relative to one another.

26 Claims, 11 Drawing Sheets

DYNAMIC DATA SET REPLICA MANAGEMENT

BACKGROUND

As an increasing amount of information processing is being performed electronically, and as the speed of that processing increases, there is a corresponding demand to improve the performance of the systems and services that manage the information being processed. One way of improving the performance of the systems and services is to redundantly store data objects using multiple storage devices and, as requests to access data are received, allocate the requests to an appropriate storage device. For example, when a read request is received, the read request may be directed to a storage device that, according to at least one measure, is experiencing the lightest load or no load at all. In a specific example, the read request may be dispatched to a storage device having the lowest number of items pending in a request queue, although other measures may be used. In this manner, operations can be performed by several devices instead of just one, thereby potentially significantly decreasing the amount of time it takes to complete operations.

One way to redundantly store data in a way that increases performance is to utilize excess storage capacity to store replicas of data objects. In a storage system that includes multiple storage devices, for example, replicas of data objects may be stored in storage space that would otherwise go unused, at least for a period of time. In this manner, storage space that would be otherwise wasted, at least temporarily, may be used to improve performance, such as noted above, and/or for other reasons, including replica storage for backup purposes. However, while the storage of replicas can provide numerous benefits at relatively small cost, in some instances storage space may become needed. There may be a need, for instance, to store a new data set and possibly one or more replicas of the new data set. In such instances, the additionally needed storage space may not be available due to use of the space for performance and/or other benefits.

BRIEF DESCRIPTION OF THE DRAWINGS

Various embodiments in accordance with the present disclosure will be described with reference to the drawings, in which.

DETAILED DESCRIPTION

Figure 1:
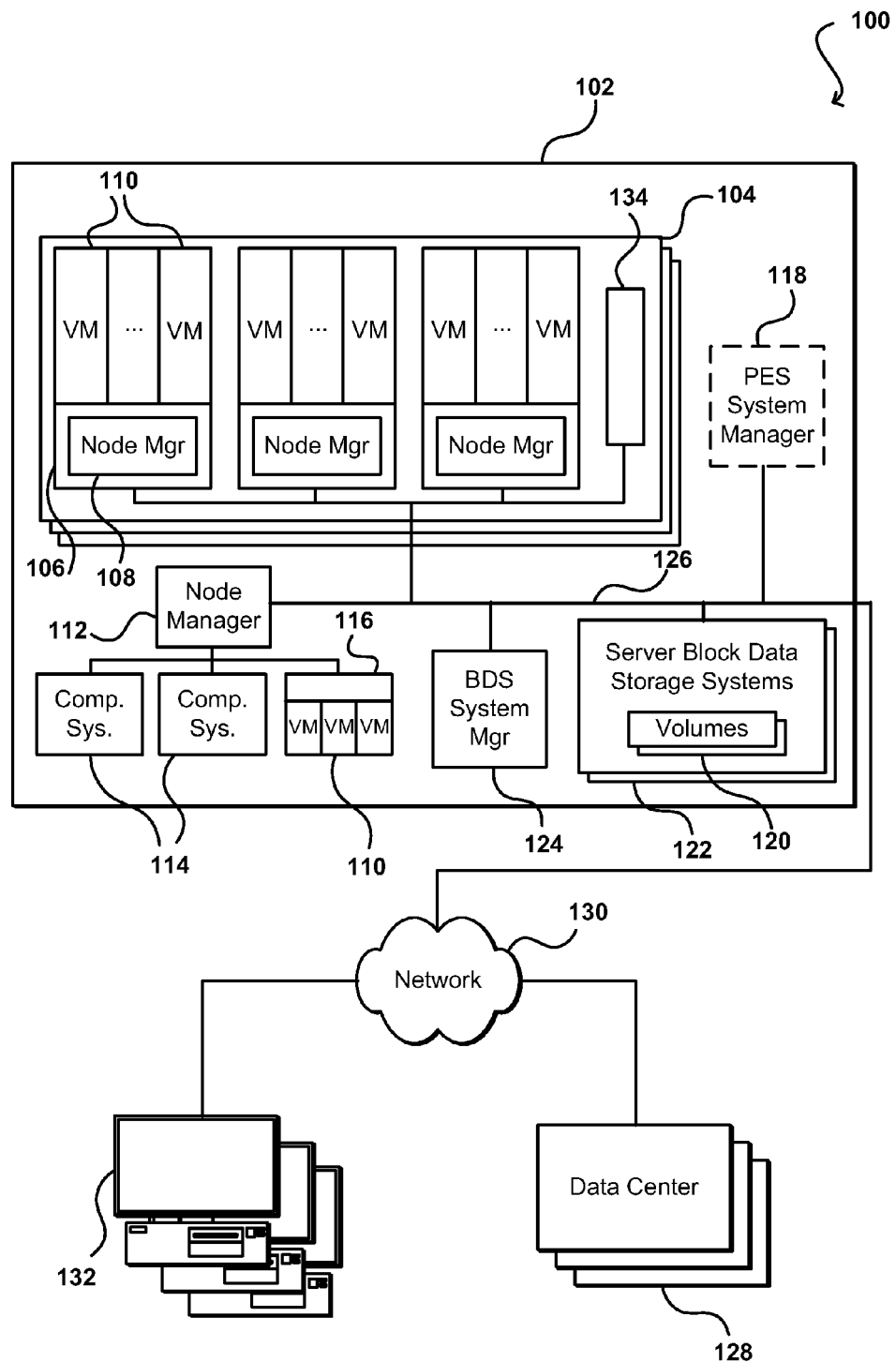
FIG. 1 illustrates a first example environment in which various embodiments can be implemented.

Systems and methods in accordance with various embodiments of the present disclosure may overcome one or more of the aforementioned and other deficiencies experienced in conventional approaches to managing input/output (I/O) operations in a computing environment. In particular, various embodiments can analyze information such as user behavior and/or read patterns in order to predict subsequent read requests (i.e., for sequential reads). Various approaches can read the information (e.g., blocks of data) such that the data is readily available upon a subsequent request for that data. Further, at least some embodiments can analyze current conditions of the computing system, network, or other such components to determine how to handle the data before that data is requested.

Usage patterns can be determined and utilized to predict behavior for a user, application, or other such entity in any appropriate environment. For example, usage patterns can be monitored in a system where virtualized operating system instances utilize attached network storage. The underlying operating system hosting the instances can have visibility into information such as disk read patterns issued by the virtual instance. By analyzing these patterns the underlying operating system can predict subsequent reads, and thus can issue speculative pre-read instructions to a storage server or other such storage device in order to reduce the read latency of a subsequent read operation issued by the virtualized operating system. Such an approach provides for relatively inexpensive (from a resource standpoint) speculative read operations that are based upon the behavior of the respective user, application, etc.

The use of speculative reads, as well as aspects such as when to use such reads and the extent of such usage, can be balanced against the potential waste in resources. Since resources such as disk drives are major sources of latency for read requests, the ability to pre-fetch data from disk and store that data in memory can reduce the overall latency of the system. On the other hand, incorrectly speculating on subsequent read requests can squander resources such as bus bandwidth, available memory, and spindle time.

Speculative read commands, however, can be relatively inexpensive as the commands can take the form of instructions to a storage server, or other such storage device, to read the data into local memory in preparation of sending that data across the network (e.g., the local bus). Approaches in accordance with various embodiments can also analyze the current load on the system, such as the workload on the storage server or traffic across the network, and can use such analysis to determine whether to pause a speculative read process. In one embodiment, a storage server might have a committed rate of I/O operations for at least a period of time, which prevents the storage server from performing speculative reads over that period. In systems with sufficient extra resource capacity, however, the tolerance for inaccurate speculations about data reads can be greater, such that the amount of speculative reads can be increased, even if the accuracy is not above a certain acceptance threshold, in order to decrease latency and provide other such performance payoffs.

In at least some embodiments, information about various read patterns and analysis can be stored such that the information is persistent across restarts or other such events. In conventional systems, the operating system looks at recent disk I/O patterns to make decisions. Any operations issued on a previous boot cycle will be lost because the data is stored in memory. In various embodiments, however, disk I/O patterns and other such information can be persisted by the hosting operating system (e.g., in the Dom-0). Such an approach enables the patterns to be persisted across restarts, such that an analyzing component can have data available at all relevant times, even after a restart, and thus can make more accurate predictions, which result in better read performance, etc.

In at least some embodiments, a system or service can have a view into more than just the operations issued by the virtualized operating system. Such a "broader" view can provide improved optimization, as an optimizer component can combine pattern data with data gathered from other optimizer components running on separate, but related, instances. Information that can be aggregated for such purposes can include time-of-day trends, data from all instances owned by the same customer, and data from all instances running a particular application (e.g., a relational database management system).

In at least one embodiment, the I/O operations for an application or client can be monitored to attempt to determine read patterns. For example, an application submitting a request for a first read bit might typically submit subsequent read requests for the next two adjacent read bits from a data storage device (e.g., a disk drive, data volume, or other block storage). If the client or application requests three adjacent bits with a sufficient frequency, rate, or other such threshold or criterion, an analysis module or other such component can determine to pre-fetch the next two bits whenever a read request is received for that client or application. Such an approach minimizes the latency for read operations by performing certain tasks ahead of time, thereby minimizing the time delay after a read request due to extra disk revolutions, seek operations, or other such actions.

Systems and methods in accordance with various embodiments of the present disclosure may overcome one or more of the aforementioned and other deficiencies experienced in conventional approaches to data storage. In particular, systems and methods described and suggested herein may balance performance with storage needs to dynamically manage the storage of replicas for one or more data sets. In an embodiment, data sets are stored redundantly in a plurality of data stores and the redundancy of the data stores is managed based at least in part on the need for storage space. Each of the data sets may correspond to a customer of a remote computing services provider that operates the data stores on behalf of the customers. The data stores may be hard disks or other storage devices and, generally, may be any devices operable to store and provide access to data. In an embodiment, each data set corresponds to a virtual storage volume and may have one or more replicas stored among the plurality of data stores. Replicas of a data set may be used to improve the rate at which read operations are performed by distributing temporally proximate read requests among different storage devices, thereby allowing different read requests to be performed simultaneously or nearly-simultaneously. Replicas of data sets may be stored partly to achieve one or more advantages of redundant storage while simultaneously utilizing storage space which may otherwise go unutilized, at least for a period of time.

In an embodiment, data storage in a system that incorporates a plurality of data stores is managed to accommodate needs for storage space that arise. As an example, data storage may be managed to allocate storage space for an additional data set, such as a data set associated with a new virtual storage volume, although various embodiments of the present disclosure are applicable in any context where additional storage space is needed. As another example, data storage may be managed to allocate storage space for one or more copies of a data set that is already stored and perhaps already redundantly stored. In accordance with an embodiment, when a need for additional storage is identified, such as in response to a request to provision a new virtual storage volume, one or more replicas of one or more corresponding data sets are identified. Storage space used for the one or more identified replicas may be reallocated for the needed additional storage space. For example, data of the identified replicas may be erased and/or allowed to be overwritten.

Identifying replicas for reallocation of storage space may be performed in various ways. In one embodiment, when a need for additional storage space is needed, one or more replicas are identified according to one or more criteria. The one or more criteria may be related to optimizing a number of replicas for each data set. As one example, in a data storage system comprising a plurality of data stores, replicas may be identified based at least in part on a rate at which data from the data sets are accessed, from the data sets themselves and/or their replicas. In a specific example, replicas are identified for reallocation of storage in a manner that, when the storage space of the identified replica(s) is reallocated, a data set that is accessed more often than another data set will have a number of replicas that is greater than or equal to the number of replicas of the other data set. For instance, if a first data set is accessed, on average, approximately twice as often as a second data set, one or more replicas of one or more data sets may be identified for reallocation of storage space so that the first data set will have approximately twice the number of replicas as the second data set.

In an embodiment, to identify one or more replicas whose space is to be reallocated to fulfill a need for additional storage space, an ideal number of replicas for each data set is calculated. An ideal number of replicas for a data set may be based at least in part on one or more factors. For example, as discussed, the ideal number of replicas for a data set may be based at least in part on the frequency at which data of the data set are accessed and the frequency at which data of other data sets are accessed. The ideal number of replicas for a data set may, in addition or as an alternative, be based at least in part on other parameters including, but not limited to, a minimum number of replicas, a maximum number of replicas, customer requirements, network characteristics including performance characteristics, the amount of data accessed during a time period, other statistical measures of data access, and/or other parameters.

When identifying one or more replicas whose space is to be reallocated to fulfill a need for additional storage space, in an embodiment, the number of replicas stored for each data set is compared with its ideal number of copies. In an embodiment, one or more data sets having a number of stored replicas that most exceeds their ideal number of replicas are identified. As noted above, storage capacity of the identified one or more data sets may be used to fulfill a need for storage capacity.

As noted above, the use of speculative reads may utilize otherwise idle computing resources in order to improve performance. Another way of improving performance in addition to or in alternative to the use of speculative reads described herein may include redundant storage of data sets in a manner that enables responding to read requests in a distributed manner. Accordingly, other techniques described and suggested herein include storing data in a manner that includes dynamically determining the number of replicas of one or more data sets. Various systems and methods may be used to implement the use of speculative reads and/or redundant data storage in accordance with the present disclosure. For example, a block data storage service can utilize multiple server storage systems to reliably store block data that may be accessed and used over one or more networks by any of various users, applications, processes, and/or services. Users of the block data storage service may each create one or more block data storage volumes that each have a specified amount of block data storage space, and may initiate use of such a block data storage volume (also referred to as a "volume" herein) by one or more executing programs, with at least some such volumes having copies stored by two or more of the multiple server storage systems so as to enhance volume reliability and availability to the executing programs. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a volume stored on a server block data storage system in a data center may execute on one or more other physical computing systems at that data center.

In addition, in at least some embodiments, applications that access and use one or more such non-local block data storage volumes over one or more networks may each have an associated node manager that manages the access to those non-local volumes by the program, such as a node manager module that is provided by the block data storage service and/or that operates in conjunction with one or more Block Data Service (BDS) System Manager modules. For example, a first user who is a customer of the block data storage service may create a first block data storage volume, and execute one or more program copies on one or more computing nodes that are instructed to access and use the first volume (e.g., in a serial manner, in a simultaneous or other overlapping manner, etc.). When an application executing on a computing node initiates use of a non-local volume, the application may mount or otherwise be provided with a logical block data storage device that is local to the computing node and that represents the non-local volume, such as to allow the executing program to interact with the local logical block data storage device in the same manner as any other local hard drive or other physical block data storage device that is attached to the computing node (e.g., to perform read and write data access requests, to implement a file system or database or other higher-level data structure on the volume, etc.). For example, in at least some embodiments, a representative logical local block data storage device may be made available to an executing program via use of an appropriate technology, such as GNBD ("Global Network Block Device") technology. In addition, when an application interacts with the representative local logical block data storage device, the associated node manager may manage those interactions by communicating over one or more networks with at least one of the server block data storage systems that stores a copy of the associated non-local volume (e.g., in a manner transparent to the executing program and/or computing node) so as to perform the interactions on that stored volume copy on behalf of the executing program. Furthermore, in at least some embodiments, at least some of the described techniques for managing access of applications and services to non-local block data storage volumes are automatically performed by embodiments of a node manager module.

In at least some embodiments, block data storage volumes (or portions of those volumes) may further be stored on one or more remote archival storage systems that are distinct from the server block data storage systems used to store volume copies. In various embodiments, the one or more remote archival storage systems may be provided by the block data storage service (e.g., at a location remote from a data center or other geographical location that has a pool of co-located server block data storage systems), or instead may be provided by a remote long-term storage service and used by the block data storage, and in at least some embodiments the archival storage system may store data in a format other than block data (e.g., may store one or more chunks or portions of a volume as distinct objects).

In some embodiments, at least some of the described techniques are performed on behalf of a program execution service that manages execution of multiple programs on behalf of multiple users of the program execution service. In some embodiments, the program execution service may have groups of multiple co-located physical host computing systems, and may execute users' programs on those physical host computing systems, such as under control of a program execution service ("PES") system manager, as discussed in greater detail below. In such embodiments, users of the program execution service (e.g., customers of the program execution service who pay fees to use the program execution service) who are also users of the block data storage service may execute programs that access and use non-local block data storage volumes provided via the block data storage service. In other embodiments, a single organization may provide at least some of both program execution service capabilities and block data storage service capabilities (e.g., in an integrated manner, such as part of a single service), while in yet other embodiments the block data storage service may be provided in environments that do not include a program execution service (e.g., internally to a business or other organization to support operations of the organization).

In addition, the host computing systems on which programs execute may have various forms in various embodiments. Multiple such host computing systems may, for example, be co-located in a physical location (e.g., a data center), and may be managed by multiple node manager modules that are each associated with a subset of one or more of the host computing systems. At least some of the host computing systems may each include sufficient computing resources (e.g., volatile memory, CPU cycles or other CPU usage measure, network bandwidth, swap space, etc.) to execute multiple programs simultaneously, and, in at least some embodiments, some or all of the computing systems may each have one or more physically attached local block data storage devices (e.g., hard disks, tape drives, etc.) that can be used to store local copies of programs to be executed and/or data used by such programs. Furthermore, at least some of the host computing systems in some such embodiments may each host multiple virtual machine computing nodes that each may execute one or more programs on behalf of a distinct user, with each such host computing system having an executing hypervisor or other virtual machine monitor that manages the virtual machines for that host computing system. For host computing systems that execute multiple virtual machines, the associated node manager module for the host computing system may in some embodiments execute on at least one of multiple hosted virtual machines (e.g., as part of or in conjunction with the virtual machine monitor for the host computing system), while in other situations a node manager may execute on a physical computing system distinct from one or more other host computing systems being managed.

The server block data storage systems on which volumes are stored may also have various forms in various embodiments. In at least some embodiments, some or all of the server block data storage systems may be physical computing systems similar to the host computing systems that execute programs, and in some such embodiments may each execute server storage system software to assist in the provision and maintenance of volumes on those server storage systems. For example, in at least some embodiments, one or more of such server block data storage computing systems may execute at least part of the BDS System Manager, such as if one or more BDS System Manager modules are provided in a distributed peer-to-peer manner by multiple interacting server block data storage computing systems. In other embodiments, at least some of the server block data storage systems may be network storage devices that may lack some I/O components and/or other components of physical computing systems, such as if at least some of the provision and maintenance of volumes on those server storage systems is performed by other remote physical computing systems (e.g., by a BDS System Manager module executing on one or more other computing systems). In addition, in some embodiments, at least some server block data storage systems each maintains multiple local hard disks, and stripes at least some volumes across a portion of each of some or all of the local hard disks. Furthermore, various types of techniques for creating and using volumes may be used, including in some embodiments to use LVM ("Logical Volume Manager") technology.

In at least some embodiments, some or all block data storage volumes each have copies stored on two or more distinct server block data storage systems, such as to enhance reliability and availability of the volumes. By doing so, failure of a single server block data storage system may not cause access of executing programs to a volume to be lost, as use of that volume by those executing programs may be switched to another available server block data storage system that has a copy of that volume. In such embodiments, consistency may be maintained between the multiple copies of a volume on the multiple server block data storage systems in various ways. For example, in some embodiments, one of the server block data storage systems is designated as storing the primary copy of the volume, and the other one or more server block data storage systems are designated as storing mirror copies of the volume in such embodiments, the server block data storage system that has the primary volume copy (referred to as the "primary server block data storage system" for the volume) may receive and handle data access requests for the volume, and in some such embodiments may further take action to maintain the consistency of the other mirror volume copies (e.g., by sending update messages to the other server block data storage systems that provide the mirror volume copies when data in the primary volume copy is modified, such as in a master-slave computing relationship manner). Various types of volume consistency techniques may be used, with additional details included below.

In addition to maintaining reliable and available access of executing programs to block data storage volumes by moving or otherwise replicating volume copies when server block data storage systems become unavailable, the block data storage service may perform other actions in other situations to maintain access of executing programs to block data storage volumes. For example, if a first executing program unexpectedly becomes unavailable, in some embodiments the block data storage service and/or program execution service may take actions to have a different second executing program (e.g., a second copy of the same program that is executing on a different host computing system) attach to some or all block data storage volumes that were in use by the unavailable first program, so that the second program can quickly take over at least some operations of the unavailable first program. The second program may in some situations be a new program whose execution is initiated by the unavailability of the existing first program, while in other situations the second program may already be executing (e.g., if multiple program copies are concurrently executed to share an overall load of work, such as multiple Web server programs that receive different incoming client requests as mediated by a load balancer, with one of the multiple program copies being selected to be the second program; if the second program is a standby copy of the program that is executing to allow a "hot" swap from the existing first program in the event of unavailability, such as without the standby program copy being actively used until the unavailability of the existing first program occurs; etc.). In addition, in some embodiments, a second program to which an existing volume's attachment and ongoing use is switched may be on another host physical computing system in the same geographical location (e.g., the same data center) as the first program, while in other embodiments the second program may be at a different geographical location (e.g., a different data center, such as in conjunction with a copy of the volume that was previously or concurrently moved to that other data center and will be used by that second program). Furthermore, in some embodiments, other related actions may be taken to further facilitate the switch to the second program, such as by redirecting some communications intended for the unavailable first program to the second program.

As previously noted, in at least some embodiments, some or all block data storage volumes each have copies stored on two or more distinct server block data storage systems at a single geographical location, such as within the same data center in which executing programs will access the volume by locating all of the volume copies and executing programs at the same data center or other geographical location, various desired data access characteristics may be maintained (e.g., based on one or more internal networks at that data center or other geographical location), such as latency and throughput. For example, in at least some embodiments, the described techniques may provide access to non-local block data storage that has access characteristics that are similar to or better than access characteristics of local physical block data storage devices, but with much greater reliability that is similar to or exceeds reliability characteristics of RAID ("Redundant Array of Independent (or Inexpensive) Disks") systems and/or dedicated SANs ("Storage Area Networks") and at much lower cost. In other embodiments, the primary and mirror copies for at least some volumes may instead be stored in other manners, such as at different geographical locations (e.g., different data centers), such as to further maintain availability of a volume even if an entire data center becomes unavailable. In embodiments in which volume copies may be stored at different geographical locations, a user may in some situations request that a particular program be executed proximate to a particular volume (e.g., at the same data center at which the primary volume copy is located), or that a particular volume be located proximate to a particular executing program, such as to provide relatively high network bandwidth and low latency for communications between the executing program and primary volume copy.

Furthermore, access to some or all of the described techniques may in some embodiments be provided in a fee-based or other paid manner to at least some users. For example, users may pay one-time fees, periodic (e.g., monthly) fees and/or one or more types of usage-based fees to use the block data storage service to store and access volumes, to use the program execution service to execute programs, and/or to use archival storage systems (e.g., provided by a remote long-term storage service) to store long-term backups or other snapshot copies of volumes. Fees may be based on one or more factors and activities, such as indicated in the following non-exclusive list: based on the size of a volume, such as to create the volume (e.g., as a one-time fee), to have ongoing storage and/or use of the volume (e.g., a monthly fee), etc.; based on non-size characteristics of a volume, such as a number of mirror copies, characteristics of server block data storage systems (e.g., data access rates, storage sizes, etc.) on which the primary and/or mirror volume copies are stored, and/or a manner in which the volume is created (e.g., a new volume that is empty, a new volume that is a copy of an existing volume, a new volume that is a copy of a snapshot volume copy, etc.); based on the size of a snapshot volume copy, such as to create the snapshot volume copy (e.g., as a one-time fee) and/or have ongoing storage of the volume (e.g., a monthly fee); based on the non-size characteristics of one or more snapshot volume copies, such as a number of snapshots of a single volume, whether a snapshot copy is incremental with respect to one or more prior snapshot copies, etc.; based on usage of a volume, such as the amount of data transferred to and/or from a volume (e.g., to reflect an amount of network bandwidth used), a number of data access requests sent to a volume, a number of executing programs that attach to and use a volume (whether sequentially or concurrently), etc.; based on the amount of data transferred to and/or from a snapshot, such as in a manner similar to that for volumes; etc. In addition, the provided access may have various forms in various embodiments, such as a onetime purchase fee, an ongoing rental fee, and/or based on another ongoing subscription basis. Furthermore, in at least some embodiments and situations, a first group of one or more users may provide data to other users on a fee-based basis, such as to charge the other users for receiving access to current volumes and/or historical snapshot volume copies created by one or more users of the first group (e.g., by allowing them to make new volumes that are copies of volumes and/or of snapshot volume copies; by allowing them to use one or more created volumes; etc.), whether as a one-time purchase fee, an ongoing rental fee, or on another ongoing subscription basis.

In some embodiments, one or more application programming interfaces (APIs) may be provided by the block data storage service, program execution service and/or remote long-term storage service, such as to allow other programs to programmatically initiate various types of operations to be performed (e.g., as directed by users of the other programs). Such operations may allow some or all of the previously described types of functionality to be invoked, and include, but are not limited to, the following types of operations: to create, delete, attach, detach, or describe volumes; to create, delete, copy or describe snapshots; to specify access rights or other metadata for volumes and/or snapshots; to manage execution of programs; to provide payment to obtain other types of functionality; to obtain reports and other information about use of capabilities of one or more of the services and/or about fees paid or owed for such use; etc. The operations provided by the API may be invoked by, for example, executing programs on host computing systems of the program execution service and/or by computing systems of customers or other users that are external to the one or more geographical locations used by the block data storage service and/or program execution service.

FIG. 1 illustrates an example of a data center-inclusive environment where speculative reads can be utilized advantageously in accordance with various embodiments. In this example network configuration 100, multiple computing systems 132 are operable to execute various programs, applications, and/or services, and further operable to access reliable non-local block data storage, such as under the control of a block data storage service and/or program execution service, in accordance with various embodiments. In particular, in this example, a program execution service manages the execution of programs on various host computing systems located within a data center 102, and a block data storage service uses multiple other server block data storage systems at the data center to provide reliable non-local block data storage to those executing programs. Multiple remote archival storage systems external to the data center may also be used to store additional copies of at least some portions of at least some block data storage volumes.

In this example, a data center 102 includes a number of racks 104, each rack including a number of host computing devices 106, as well as an optional rack support computing system 134 in this example embodiment. The host computing systems 106 on the illustrated rack 104 each host one or more virtual machines 110 in this example, as well as a distinct node manager module 108 associated with the virtual machines on that host computing system to manage those virtual machines. One or more other host computing systems 116 may also each host one or more virtual machines 110 in this example. Each virtual machine 110 may act as an independent computing node for executing one or more program copies (not shown) for a user (not shown), such as a customer of the program execution service. In addition, this example data center 102 further includes additional host computing systems 114 that do not include distinct virtual machines, but may nonetheless each act as a computing node for one or more programs (not shown) being executed for a user. In this example, a node manager module 112 executing on a computing system (not shown) distinct from the host computing systems 114 and 116 is associated with those host computing systems to manage the computing nodes provided by those host computing systems, such as in a manner similar to the node manager modules 108 for the host computing systems 106. The rack support computing system 134 may provide various utility services for other computing systems local to its rack 102 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

In this example, an optional computing system 118 is also illustrated that executes a PES System Manager module for the program execution service to assist in managing the execution of programs on the computing nodes provided by the host computing systems located within the data center (or optionally on computing systems located in one or more other data centers 128, or other remote computing systems 132 external to the data center). As discussed in greater detail elsewhere, a PES System Manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the PES System Manager module may coordinate with the node manager modules 108 and 112 to manage program execution on computing nodes associated with the node manager modules, while in other embodiments the node manager modules may not assist in managing such execution of programs.

In this example the data center 102 also includes a computing system 124 that executes a Block Data Storage ("BDS") system manager module for the block data storage service to assist in managing the availability of non-local block data storage to programs executing on computing nodes provided by the host computing systems located within the data center (or optionally on computing systems located in one or more other data centers 128, or other remote computing systems 132 external to the data center). In particular, in this example, the data center 102 includes a pool of multiple server block data storage systems 122, which each have local block storage for use in storing one or more volume copies 120. Access to the volume copies 120 is provided over the internal network(s) 126 to programs executing on various computing nodes 110 and 114. As discussed in greater detail elsewhere, a BDS System Manager module may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS System Manager module may coordinate with the node manager modules to manage use of volumes by programs executing on associated computing nodes, while in other embodiments the node manager modules may not be used to manage such volume use. In addition, in other embodiments, one or more BDS System Manager modules may be structured in other manners, such as to have multiple instances of the BDS System Manager executing in a single data center (e.g., to share the management of non-local block data storage by programs executing on the computing nodes provided by the host computing systems located within the data center), and/or such as to have at least some of the functionality of a BDS System Manager module being provided in a distributed manner by software executing on some or all of the server block data storage systems 122 (e.g., in a Peer to-peer manner, without any separate centralized BDS System Manager module on a computing system 124).

In this example, the various host computing systems, server block data storage systems, and computing systems are interconnected via one or more internal networks 126 of the data center, which may include various networking devices (e.g., routers, switches, gateways, etc.) that are not shown. In addition, the internal networks 126 are connected to an external network 130 (e.g., the Internet or other public network) in this example, and the data center 102 may further include one or more optional devices (not shown) at the interconnect between the data center and an external network (e.g., network proxies, load balancers, network address translation devices, etc.). In this example, the data center 102 is connected via the external network 130 to one or more other data centers 128 that each may include some or all of the computing systems and storage systems illustrated with respect to data center 102, as well as other remote computing systems 132 external to the data center. The other computing systems 132 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 122 may further be interconnected with one or more other networks or other connection mediums, such as a high-bandwidth connection over which the server storage systems 122 may share volume data (e.g., for purposes of replicating copies of volumes and/or maintaining consistency between primary and mirror copies of volumes), with such a high-bandwidth connection not being available to the various host computing systems in at least some such embodiments.

An environment such as that illustrated with respect to FIG. 1 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability. A customer can make a Web service call into an appropriate API of a Web service layer of the system to provision a data volume and attach that volume to a data instance for that customer.

It will be appreciated that the example of FIG. 1 has been simplified for the purposes of explanation, and that the number and organization of host computing systems, server block data storage systems and other devices may be much larger than what is depicted in FIG. 1. For example, as one illustrative embodiment, there may be approximately 4,000 computing systems per data center, with at least some of those computing systems being host computing systems that may each host fifteen virtual machines, and/or with some of those computing systems being server block data storage systems that may each store several volume copies. If each hosted virtual machine executes one program, then such a data center may execute as many as sixty thousand program copies at one time. Furthermore, hundreds or thousands (or more) volumes may be stored on the server block data storage systems, depending on the number of server storage systems, size of the volumes, and number of mirror copies per volume. It will be appreciated that in other embodiments, other numbers of computing systems, programs and volumes may be used.

Figure 2:
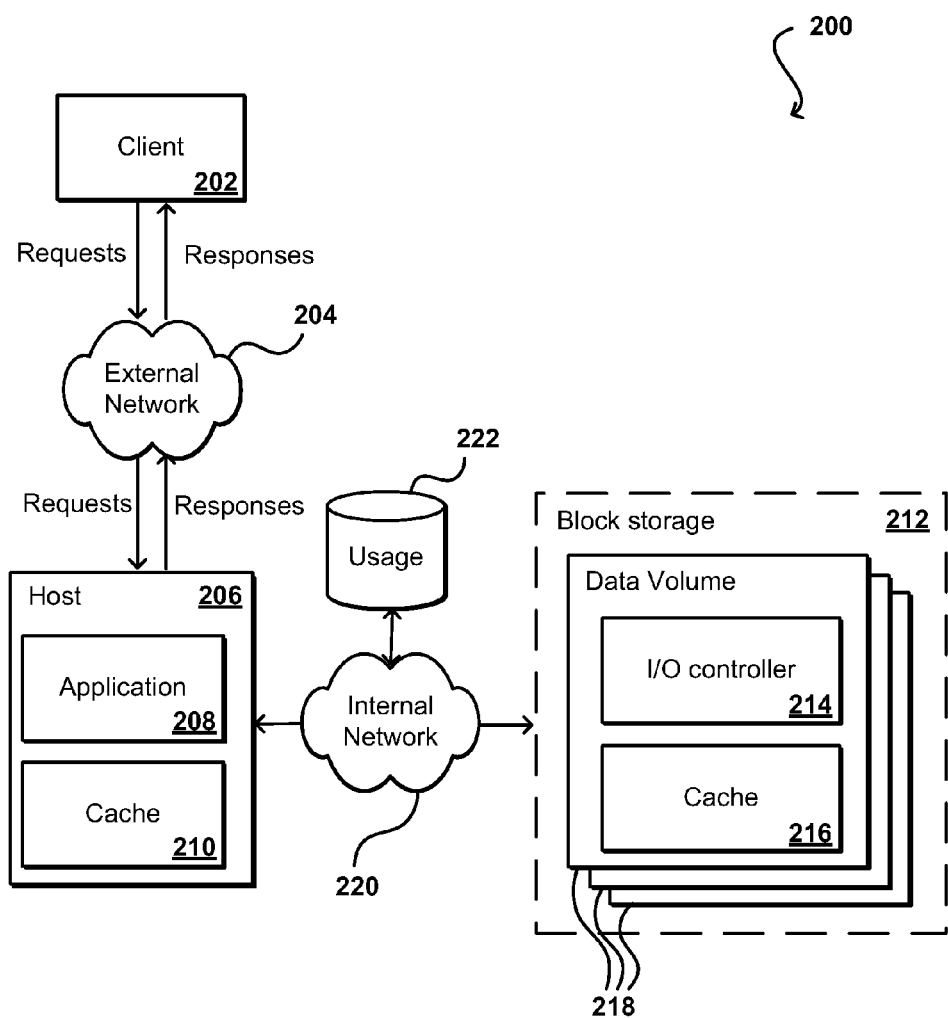
FIG. 2 illustrates a second example environment in which various embodiments can be implemented.

FIG. 2 illustrates a simplified example environment 200 which shows the flow of data for read requests using a set of components, which in some embodiments can correspond to a subset of the components discussed with respect to FIG. 1. In this example, a client 202 submits a read request to a host device 206 across a network 204, which in this example is an external network such as the Internet, although in other embodiments this could be a portion of an internal network between an application or service and a host, etc. The host 206, in turn, can submit requests for data to at least one block storage system 212 across a second network 220, which can be at least a portion of an internal network (e.g., a network bus). Such an approach can be used to manage the provision and use of reliable non-local block data storage functionality to clients, applications, or other such entities. Non-local block data storage functionality can be provisioned to an application 208 executing on the host computing system 206 and/or on at least some other computing systems, which may be internal to the system or located across the external network 204. The application 208 can have access to one or more block data storage volumes 218 provided by one or more server block data storage systems 212. The host 206 can utilize a node manager or other such component, as discussed above, to manage access of the application 208 executing on the host to at least some of the non-local block data storage volumes 218.

The example environment also includes at least one database 222 configured to store information about the access patterns for the client 202, application 208, and/or other such entities. The database can include information for specific volumes stored on the server block data storage system 212, as well as on any archival storage system (e.g., for use in managing the volumes), and may further store various other information (not shown) about users or other aspects of the block data storage service. In some embodiments, each node manager module on a host computing system 206 can store information about the current volumes attached to the host computing system and used by the executing application(s) on the host computing system, such as to coordinate interactions with the server block data storage systems. While not illustrated here, each host computing system may further include a distinct logical local block data storage device interface for each volume attached to the host computing system and used by a program executing on the computing system, which may further appear to the executing programs as being indistinguishable from one or more other local physically attached storage devices that provide local storage.

Approaches in accordance with various embodiments can leverage the high visibility provided by the virtualized environment such as that illustrated in FIG. 1 or FIG. 2 to create improved read-ahead optimizations, and make those optimizations efficiently, in order to reduce read latency and provide other such advantages. Further, the information can be stored in such a way that the determined patterns and analysis are persistent across restarts or other such events.

Figure 3A:
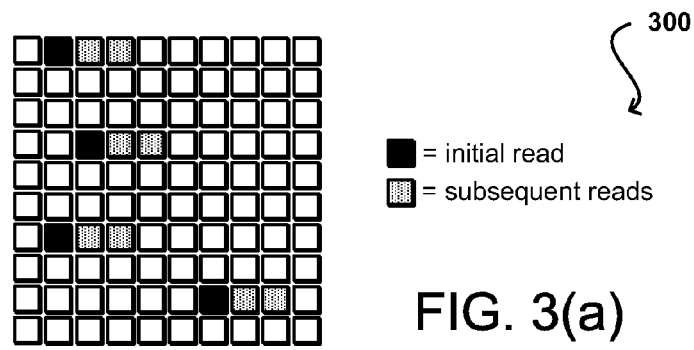
FIGS. 3(a), 3(b), and 3(c) illustrate example read patterns against blocks of data that can be analyzed in accordance with various embodiments.

For example, FIG. 3(a) illustrates an example of a set of data blocks 300 that can be analyzed in accordance with various embodiments. As should be understood, other types of data groupings in other types of arrangement can be used as well with various embodiments. In this example, each black block indicates the initial block that was read in response to a request from a user, for an application, on a session, or otherwise associated with a particular aspect, entity, etc. In this example, a monitoring system tracks not only the position of the first read for a set of requests, but also the position of each subsequent read. In this example, it can be seen that for each initial read request for a particular user, for example, the following two blocks (illustrated with a patterned fill) were read by subsequent read requests in the set. Such information can be analyzed by a system manager or other such component to attempt to determine patterns in read requests. By analyzing the data from the example of FIG. 3(a), it can be determined that when a user submits a read request for a block of data, the following two blocks will likely be requested in at least one subsequent request.

Figure 3B:
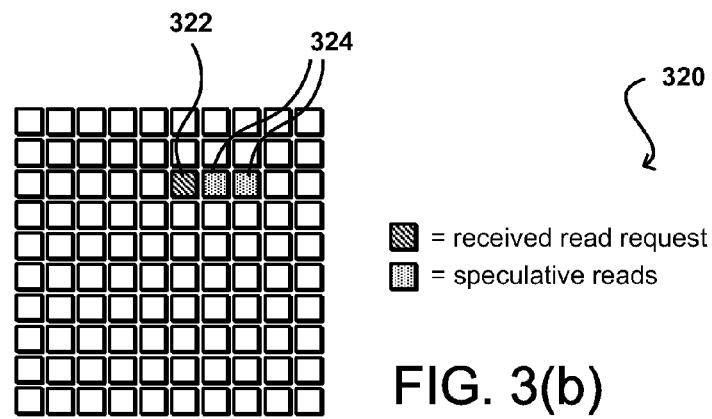

Once a pattern is determined, that pattern can be applied to future requests. Consider the example of FIG. 3(b) which illustrates a similar example set of data blocks 320. A read request is received from a user for a particular block of data 322. Once the read request is received, a system manager or other such component can analyze the stored information to determine whether a pattern matches an aspect of that request. For example, there might be a pattern that matches a user or application associated with that request, a volume on which the request is being executed, or any other such aspect. In this example, the analysis based on the information from FIG. 3(a) indicates that a pattern matches the initial read request for the block of data 322. Since the pattern indicates that subsequent reads requests likely will request the next two blocks of data 324, the system can go ahead and read those blocks from the block storage (e.g., pull off disk and store in memory) in order to perform time-intensive portions before those subsequent read requests are received.

Figure 3C:
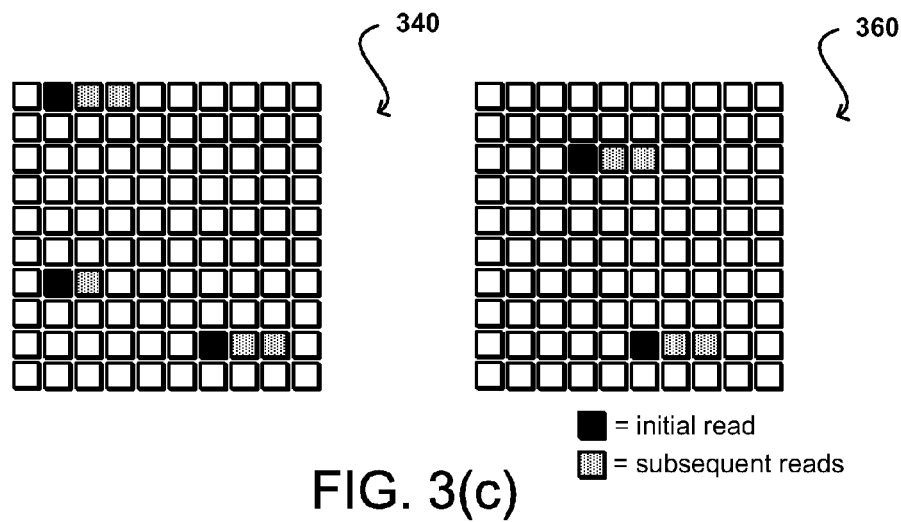

In some instances, a user or application might submit read requests across multiple volumes, instances, block storage systems, data centers, or other such groupings of data. In at least some embodiments, this information can be aggregated to improve upon pattern determination. For example, FIG. 3(c) illustrates an example wherein a user submits reads against two different sets of data blocks 340, 360. In the first set 340, only two of the three reads have the same subsequent read pattern, which might not be sufficient to perform a speculative read in at least some embodiments. In the second set 360, there are only two data points (e.g., two initial reads with subsequent behavior) which might not provide enough data points for an acceptable prediction. If a system is able to aggregate the behavior with respect to both sets, however, the data might provide enough certainty to enable a pattern to be determined and applied to future reads. In this example, aggregating the data provides five data points, which might be enough to be statistically significant (or at least meet some other threshold) in at least some embodiments. Further, since four of the five instances exhibit similar behavior, a minimum threshold frequency or other such criterion might be met to determine that it is likely advantageous to perform speculative reads according to that determined behavior. In this case, the frequency with which a user reads the next two blocks after an initial read might be sufficient to cause a system to perform speculative reads of two subsequent blocks whenever a read is received for that user.

In at least some embodiments, the threshold at which a pattern can be determined and/or applied can be set by any appropriate entity, such as a user, provider, or system, and can be adjusted based on factors such as load and performance. For example, if the system is under a heavy load then a higher frequency might be required in order to prevent a large number of speculative reads from being made that are not actually needed. Similarly, if the load on the system is light then the system might perform speculative reads for any pattern that can reasonably be interpreted. Many other levels and determinations can be used as well within the scope of the various embodiments.

Figure 4:
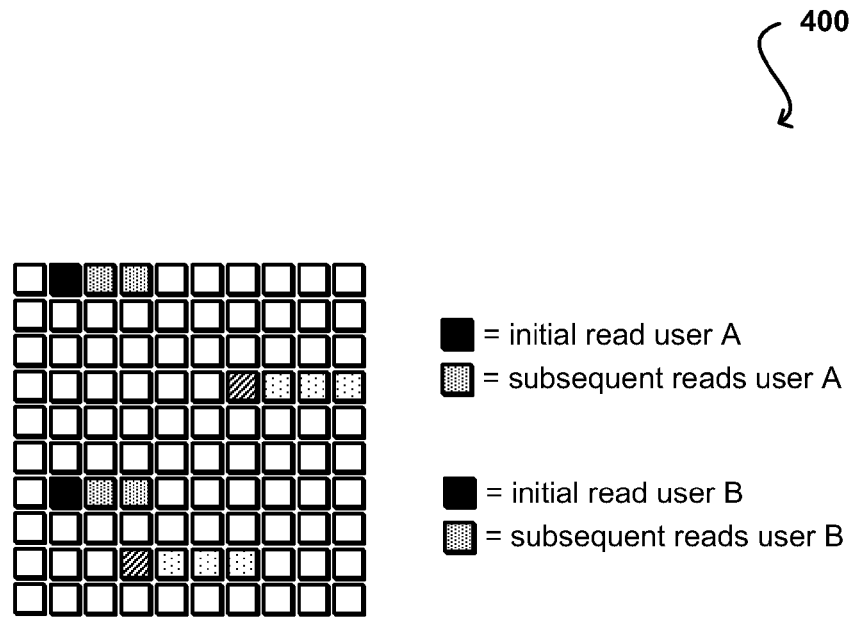
FIG. 4 illustrates example read patterns for multiple users against a block of data that can be analyzed in accordance with various embodiments.

In some cases, multiple users or applications can submit requests against a common data volume or other grouping of data. For example, the set of data blocks 400 in FIG. 4 shows the behavior of two different users, user A and user B. In some cases, a system can attempt to determine patterns of usage for the data volume as a whole. In this case, it can be seen that each user typically submits subsequent reads for at least the next two data blocks after an initial read request, such that the system might perform speculative reads of the two subsequent blocks for any initial read request received on that volume. In other embodiments, a system might instead attempt to optimize on the behaviors of individual users or applications with respect to that volume. In this example, user A typically reads the next two blocks after an initial read, while user B typically reads the next three blocks. If the system load allows for such optimization, the system can attempt to perform a number of speculative reads for each user or application that is predicted based upon the respective behavior.

In some embodiments where behavior can be analyzed at the block storage system level, patterns can be detected across many different instances. Behavior can be analyzed across different instances for a common customer, assuming in at least some embodiments that the customer instances of a given class will exhibit similar patterns. In some embodiments, an analyzing component of the block storage layer can test one or more strategies or patterns against a percentage of the customer's instances to determine which patterns provide accurate results, performance enhancements, or other such benefits. In certain embodiments, such testing also can be done across customers or applications. For example, certain customers might do a significant amount of online transaction processing with a specific type of database. Building up a set of behavior information for such users can enable the system to make accurate predictions for other customers doing similar types of things, based upon the user performing a type of activity (e.g., online transaction processing) with respect to a certain type of resource (e.g., type of database). In some embodiments, patterns can be applied based at least in part upon other types of information as well, such as information provided by customers about their volumes and/or instances. Such an approach can at least provide a reasonable starting point for speculative reads, which can then be optimized over time for specific users, applications, etc.

Further, approaches in accordance with various embodiments can determine what to do with data for speculative reads based upon factors such as network load and resource capacity. For example, consider again the example of FIG. 2. In this example the client 202 might send a request to a host 206 across an external network which might issue read requests to the block storage system 212. The block storage system might perform one or more speculative reads based upon at least one aspect associated with the read requests, such as a session identifier or client identifier. Based on aspects of the block storage system, internal network, host, or other such component, the block storage system might decide to send the data for the speculative reads across the network to the host 206 to be stored in cache 210 or other such memory, or might decide to perform the reads from the physical storage medium according to an I/O controller 214 for an instance 218, but instead store the data in local cache 216 at the data local instance 218 instead of sending the data over the internal network 220. It should be understood that similar determinations can be used as to whether to send such data over an external network as well, to one or more resources or devices external to the data provider system, etc.

Such an approach can be utilized in various other embodiments as well. The server or device hosting a drive or other data storage mechanism can read the data for the speculative read(s) into memory, and can determine whether to send that data to another destination or store that data locally. If a host is likely to request the data according to the usage pattern, the host has available storage capacity, and the network between the server and the host is not congested, the server might go ahead and send the data for the speculative reads to the host (or to the DOM-0 for the virtual instance, etc.). If, however, the network is congested or the host does not have sufficient storage capacity, for example, the data server might instead store the data locally without sending the data across the network to the host. Since the time spent reading the data from disk into memory is a major source of latency, performing the speculative read but storing locally can still provide a significant reduction in latency for subsequent read requests. When a subsequent read request is received to the data server for data that is already in memory, the data server can quickly send the data to the host without having to wait to read that data from disk or other such storage. In other embodiments, the system might decide to send the information to some intermediate storage or cache to reduce latency where possible.

In some embodiments, a system administrator might configure discrete settings or otherwise adjust the level of aggressiveness of the speculations at different times, for different situations, or for any other appropriate reason. In any situation where a resource has excess capacity and a benefit can be gained by pre-fetching data or otherwise speculating on user behavior, a system or administrator can have the option or ability to utilize as much of that resource as possible while maintaining other functional aspects of the system.

Further, such a system can provide for many types of read-ahead operation, as opposed to a binary "read ahead" or "no read ahead" as in conventional disk-based systems. A number of different prediction algorithms can be used to determine which blocks to be pre-fetched, how far out to fetch the data, reads for which to fetch data, etc. In addition to pattern detection algorithms such as "most recently used" or "most recently modified" algorithms, various other algorithms can be used as well that can take into account various other types of input. For example, a system can perform Bayesian analysis or utilize another such statistical inference algorithm. In some embodiments, multiple speculative read approaches can be attempted concurrently in order to determine an effectiveness of each approach under certain circumstances, for certain aspects, etc. In some embodiments, the algorithms can be used to predict behavior but not actually applied until the results are analyzed and a level of performance or accuracy for each determined. For example, the predictions and actual requests can be stored, and then analyzed to determine the optimal approach for subsequent reads, etc. Further, unlike reads at the operating system or disk level, such an approach can enable different read approaches to be made for different types or sources of traffic across the same virtual drive, instance, etc.

As discussed, certain embodiments can implement the speculative nature in the DOM-0, which can provide a substantial amount of information at the host level. Further, storing information in a location away from the block storage device enables the information to be recovered in the event of a failure or restart. The pattern information and analysis can be thought of as metadata associated with the block storage volume instead of being associated with the host. Having that information available also allows a volume to be attached to a different host or DOM-0 without losing the ability to leverage that information. Further, such an approach enables the expanding of data volumes while still being able to rely on determined access patterns, such as by using access patterns for similar boot volumes, etc.

In some embodiments, it also can be beneficial to know which applications are associated with a given data volume, as a given volume might be accessed by multiple applications each using a different access pattern. Further, it can be beneficial to know the snapshot from which a given volume was created, as patterns for that snapshot also can be applied to each resulting volume. Thus, it can be beneficial to persistently store metadata associated with a body of data and/or associated with the instance type of the application that is going to use the data.

Figure 5A:
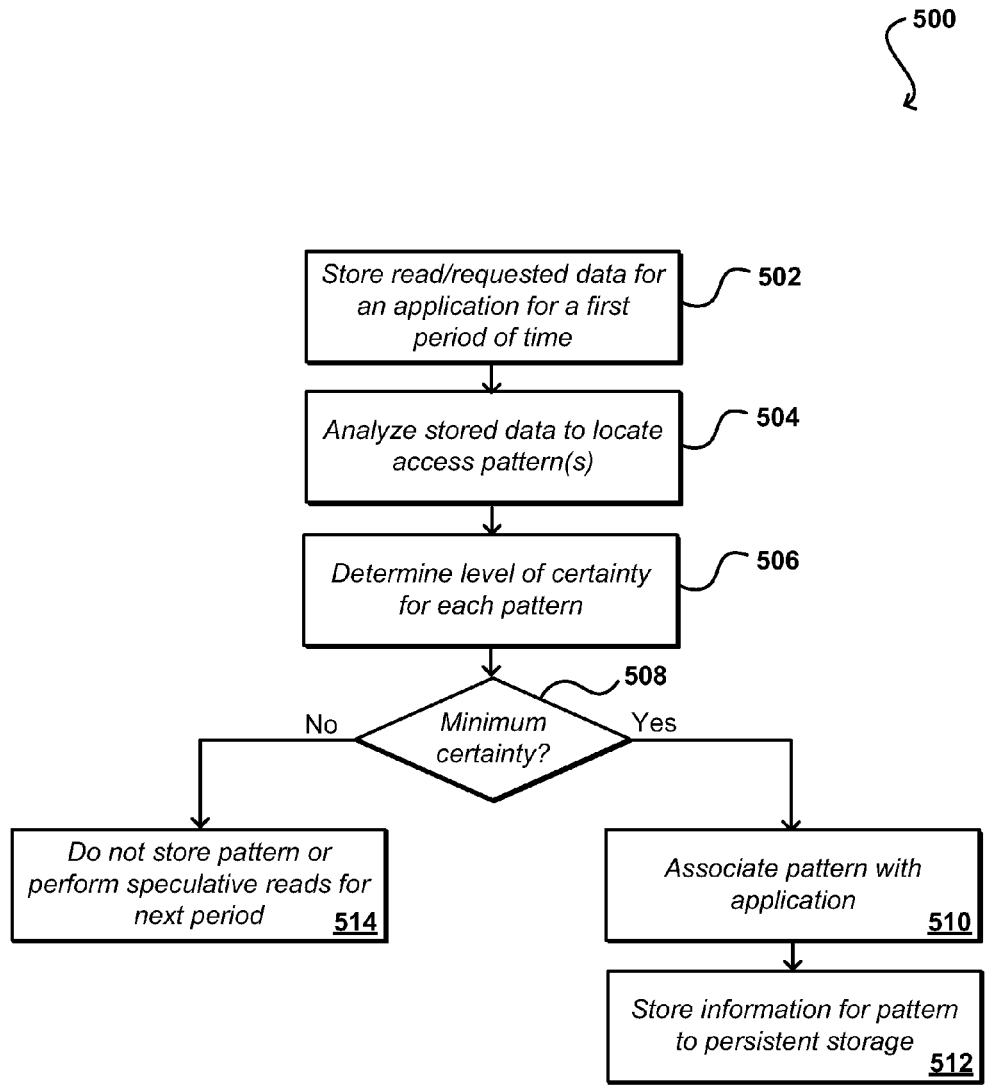
FIGS. 5(a) and 5(b) illustrate an example process for determining behavioral patterns and pre-fetching data based on those patterns in accordance with at least one embodiment.

FIG. 5(a) illustrates an example process 500 for determining patterns in read requests that can be used in accordance with at least one embodiment. Although the example process is illustrated as a series of steps, it should be understood that there can be additional, fewer, or alternative steps performed in similar or alternate orders, or in parallel, within the scope of the various embodiments unless otherwise stated. Similarly, such approaches can be used to perform other speculative operations as well in other embodiments. In this example, a user has an application that is scheduled to execute, and thus access data, at certain times. The user might have an application that the user runs once a day to analyze the data for that business day. The user might boot up the application at the end of the work day to analyze data on a data volume, and when the analysis is complete the user terminates the application. As part of the process, read data for an application can be stored for a first period of time 502. In this example, a single record of every disk block that was read can be persisted after the first run of the application on the data for a given day. The persisted data can be analyzed to attempt to locate patterns in the data 504. Any appropriate pattern matching or data analysis algorithm can be used for the analysis as discussed elsewhere herein. For each pattern, a level of certainty, frequency, or other such metric can be determined 506. For example, the application might be determined to read data blocks in groups of three at least 75% of the time, and blocks in groups of at least two at least 90% of the time. If any of the patterns is determined to at least meet a minimum certainty threshold or other such criterion 508, that pattern can be associated with the application 510 and stored in an appropriate persistent storage for subsequent use 512. In some embodiments additional information can be captured in the pattern as well. For example, if the application reads the next adjacent block half a second after the previous block, then the system might advantageously pre-fetch the data any time within that half-second if conditions are favorable, even if the system might not pre-fetch the data immediately after the previous block due to the conditions at that time. The patterns and/or analysis data in at least some embodiments can be stored as metadata associated with a given data volume. If no patterns are detected, or no pattern at least meets the minimum level of certainty, etc., then no speculative reads might be performed for the next period of application reads 514.

Figure 5B:
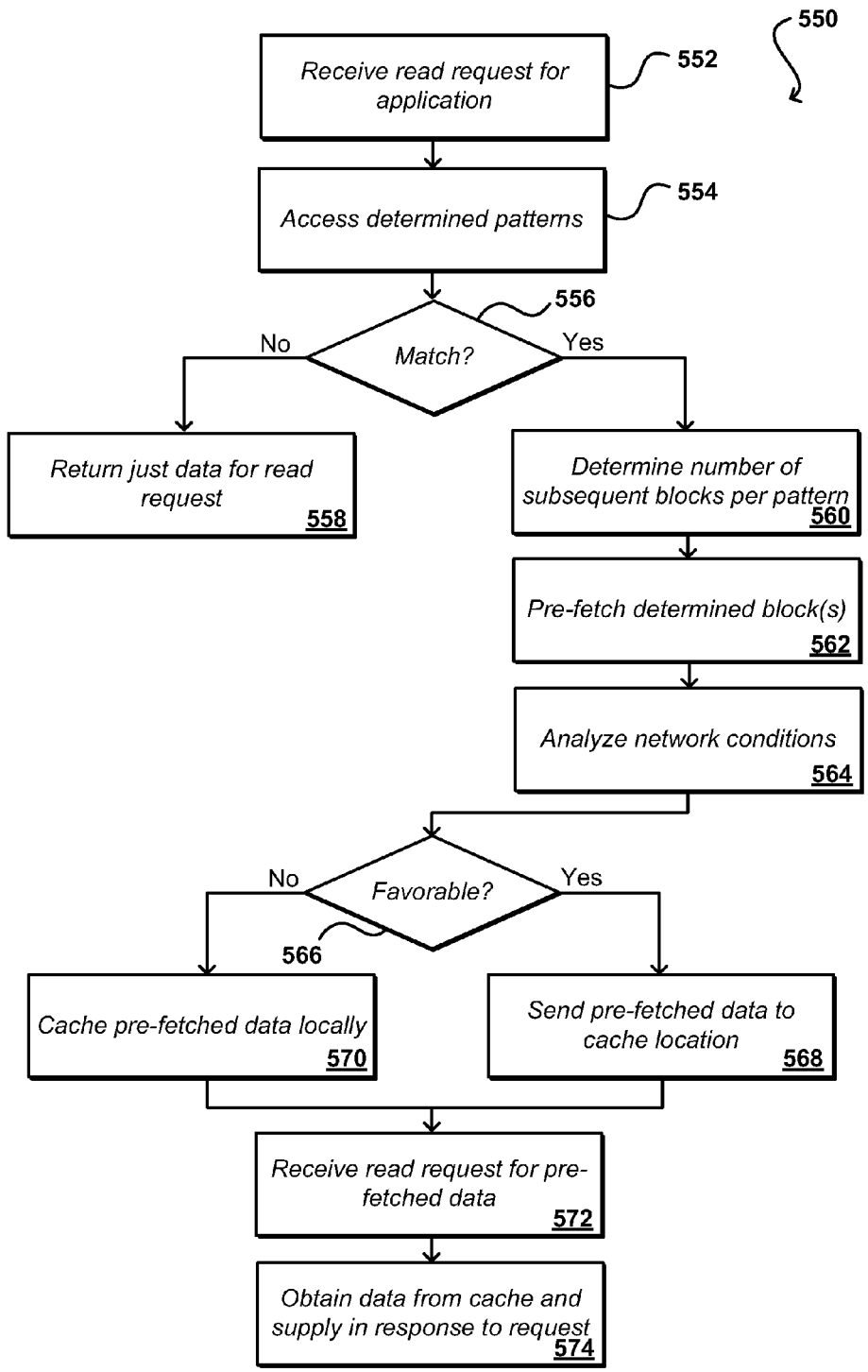

FIG. 5(b) illustrates an example process 550 for using determined patterns to perform speculative reads that can be used in accordance with at least one embodiment. At some time subsequent to a pattern determination such as the one described with respect to FIG. 5(a), another period can begin wherein those patterns can be applied to the read requests for that application. For example, an application can be executed again after the end of the next work day. At some point after the application is re-executed, a read request will be received for that application 552. A system or service receiving the request can access the determined disk access pattern(s) for that application 554 (or client, user, volume, etc.), as may be stored as metadata associated with a particular data volume or other such component. If no pattern is found to match the request 556, the system can return the data for the read request 558 and wait for the next request. If at least a pattern is found to match the request, the system or service can select and use a pattern to anticipate the future actions of the application based at least in part upon the stored metadata. In this example, the system can determine the number of subsequent data blocks the application is likely to request based on past behavior 560, and based on the single received read request can pre-fetch at least one additional data block according to the usage pattern for the application 562. If there are multiple patterns that match, the system or service can select a pattern that is optimal for current network load, session data, or other such information.

In this example, the system or service also can analyze certain existing network conditions or resource state information 564. For example, a system can determine whether a network path between a data volume and a host has excess available bandwidth, and/or whether the host has available excess memory to temporarily store data. Based at least upon whether there are favorable network conditions for sending data 566, the system or service can determine to send the data across the network to a host running the application or an intermediate caching destination between the data source and the application 568, or can determine to store the data at the data volume or host machine with the disk drive, etc. 570. There are many places in various systems where the data can be cached or otherwise stored temporarily, such as on any host device, on a flash device for a data volume, or on a device dedicated to handle caching, etc. If a read request is subsequently received that requires the pre-fetched blocks 572, the application can obtain that data from the temporary storage location 574 (e.g., either host, depending on the current location) without having to wait for the data block(s) to be read from disk. Such an approach can also take into account information such as the bus constraints. By examining the load at the current time, the system can determine whether or not to ship the pre-fetched bits all the way across the respective network to the host machine. If shipping the bits will not affect any other work, the system might decide to undertake that extra effort now, even if it is not certain whether that extra effort will pay off in improved performance. In some embodiments, the system can also determine how to send the data across the network, such as to send in parallel or serialize, segment into smaller packets, wait to fill up an Ethernet frame, etc.

While in many embodiments a storage entity (e.g., a block data storage service or BDS manager) can drive the speculation for multiple users, applications, hosts, or storage entities, for example, in other embodiments an entity outside of the storage entity and any compute entity or node can perform the data analysis and/or direct the speculation. Such an approach enables access patterns and functionality to be separated from the compute and storage entities, such that the patterns and functionality can be shared among new or other such entities or nodes. Further, the lifetime of the access patterns and other such information can extend beyond that of any individual entity, and can be used to predict information for future entities.

Figure 6:
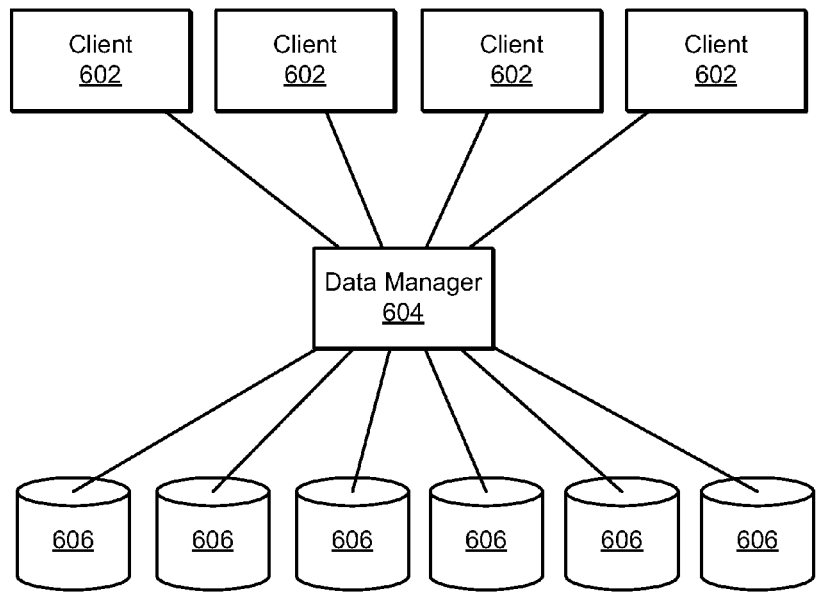
FIG. 6 illustrates a third example environment incorporating a data storage system in which various embodiments can be implemented.

FIG. 6 illustrates an example environment 600 in which various embodiments of the present disclosure may be practiced. As illustrated, the environment 600 in FIG. 6 includes a plurality of clients 602. The clients may be devices (real and/or virtual) that access a network that includes the environment 600 in order to access data stored in accordance with the illustrated embodiment. For instance, the environment 600 may be utilized in connection with an organization that provides remote computing services. The organization may operate and provide access to various computing resources (computer hardware, software, storage, and/or the like) to one or more customers. The organization may, for example, provide a block data storage service and/or other service, such as discussed above. The clients may be devices of the customers that access the resources of the organization remotely, such as over a communications network, such as the Internet. The clients may also be virtual machine instances operating on behalf of the customers by the remote computing services provider, such as the virtual machines described above in connection with FIG. 1. The virtual machines may operate on hosts that are able to access other remote computing services. While various descriptions of the present disclosure are directed to a remote computing services environment for the purpose of illustration, it should be also understood that the environment 600, and variations thereof, may be utilized in other contexts as well. For example, each of the clients 602 and other components described in connection with FIG. 6 may be part of a single organization, or some of the clients may be of the organization and others may be from other organizations.

In an embodiment, each of the clients 602 accesses data storage by sending commands to a data manager 604. A data manager 604 may be an application executing on one or more computing devices that enables the one or more computing devices to at least direct the commands to an appropriate computing resource, such as a server operable to act responsive to the commands, such as in a manner discussed below. The data manager 604 may be, for example, a BDS system manager such as the BDS system manager described above, or a variation thereof.

In an embodiment, each of the clients 602 utilizes one or more data stores 606 for the storage of information. The data stores 606 may be part of a multiple server block data storage system, such as described above in connection with FIG. 1. To access information in one or more of the data stores 606, a client may issue a command to a server operating in connection with the data manager 604. The data manager 604 may then cause the command (or information corresponding to the command) to be communicated to an appropriate data storage device. For example, while not illustrated in the Figure, each of the data stores 606 may operate in connection with a corresponding server that is able to receive commands to have data operations (such as create, read, update, and/or delete operations) performed, cause the operations to be performed, and communicate acknowledgements that the operations were performed and/or other relevant information. A client 602 may, for instance, issue a read command to the data manager 604 in order to obtain information from one of the data stores 606. The data manager 604 may utilize a mapping to select one of the data stores 606 and issue the command to the selected data store 606. A server operating in connection with the selected data store may receive the command from the data manger 604, perform the read operation, and send data from the selected data store 606 to the client 602 (possibly through the data manager 604) that made the request.

Environments, such as the environment 600 discussed above, may be used in various ways. Data stores 606 may be used to store various data sets on behalf on customers and/or other users. The data stores 606 may be used to redundantly store the data sets for various reasons. For example, data sets may be stored redundantly to provide security in the event that a data store stops functioning or otherwise becomes inaccessible. As another example discussed above, redundantly storing a data set may allow performance increases by, for instance, allowing read operations to be made from several different data stores instead of from a single data store, thereby spreading the load from one or more applications among several data stores. The data manager 604 may, for example, issue a read command to a first data store having a copy of an appropriate data set and then issue another read command to a second data store having another copy of the appropriate data set. In this manner, the second data store does not need to wait until the read command to the first data store is complete before performing the operation. The data manager 604 may then be able to access information more quickly than if the data manager 604 was required to issue all read commands to a single data store.

The data manager 604 may utilize various information available to it to determine to where to dispatch commands. If one data store, for example, has a longer request queue than another data store, the data manager 604 may then issue a command to the other data store. The data manager 604 may look to other parameters as well including, but not limited to, the amount of time a data store is taking to perform operations, the time since the latest request in a request queue of a data store was issued, network traffic between the data manager 604 and a data store, and, generally, any information indicative of the rate at which data stores are able to perform requested operations.

In an embodiment, the data stores 606 in the environment 600 are used to redundantly store data sets. Copies of a data set accessible by a client 602, for example, may be stored in multiple data store 606. For example, one copy of the data set may be stored in one data store 606 while another copy of the data set may be stored in another data store 606. Further, a data store may be stored across multiple data stores 606. A part of the data set may be stored in one data store 606 while another part of the data set may be stored in one or more other data stores 606. Generally, a data set for a client 602 may be stored in any manner such that, at least a portion of the data set is accessible from multiple data stores. In some embodiments, every portion of the data set is accessible from multiple data stores. The storage of multiple data copies of one or more data sets using the data stores 606, as noted, may be used to improve performance, such as by using multiple data stores to respond to a series of read requests. Other techniques for improving performance, including, but not limited to, techniques incorporating speculative reads discussed above may also be used in connection with the environment 606, or variations thereof.

Figure 7:
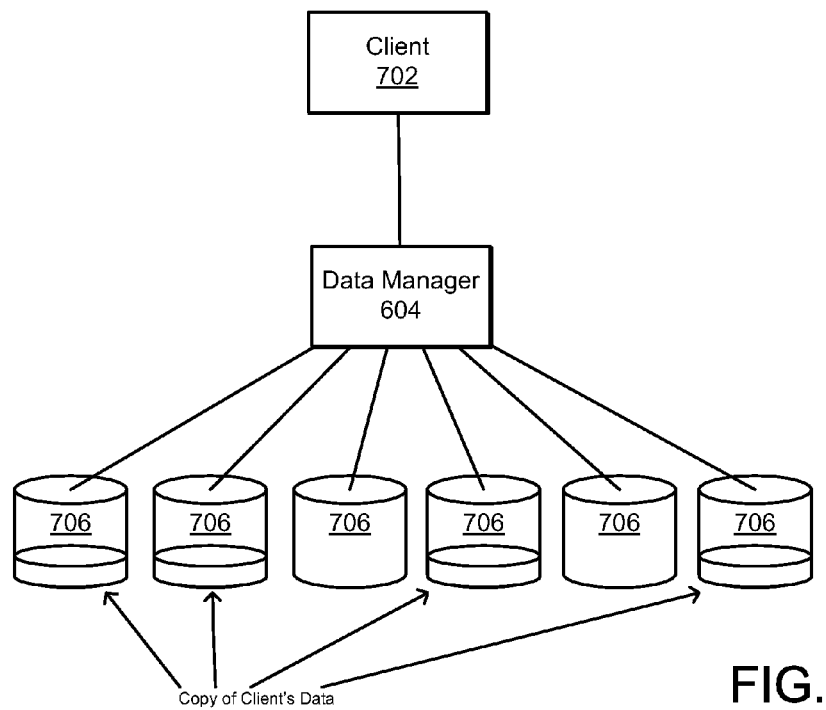
FIG. 7 illustrates the third example environment of FIG. 6, from the perspective of a single client.

FIG. 7 illustrates how multiple copies of a data set may be stored, in accordance with an embodiment. In particular, FIG. 7 illustrates an environment 700 in which various embodiments of the present disclosure may be practiced. The environment 700 may be a portion of the environment 600 discussed above in connection with FIG. 6, from the perspective of a single client 602. Accordingly, as illustrated, the environment 700 includes a client 702, a data manager 704, and a plurality of data stores 706, which may operate in a manner similar to the similarly-named counterparts discussed above in connection with the environment 600 discussed above in relation to FIG. 6.

As illustrated, a copy of a data set accessible by the client 602 is stored in a plurality of the data stores 706. As shown, a copy of the data set is in several, but not all of the data stores 706, however, each data store may have a copy of the data set. While FIG. 7 illustrates multiple copies of a data set accessible by the client, various embodiments of the present disclosure would also apply when only a single copy of a data set is accessible by the client 602. In other words, various embodiments of the present disclosure may apply to situations in which one or more data sets are not redundantly stored or when one or more data sets are redundantly stored and one or more other data sets are not redundantly stored. When the data manager 704 receives a command from the client 702, in an embodiment, the data manager 704 may select one of the data stores 706 containing a copy of the data set and issue the command to the selected data store. As noted, selection of the data store may be based at least in part on one or more criteria for optimizing performance of data operations, such as read operations, although it may be random or based at least in part on other criteria. The client may have no role in the selection of the data store, but may submit requests (such as web service requests) to the data manager that are agnostic to particular data stores, that is, that do not identify a particular data store from the plurality of data stores. However, in some embodiments, the client may have at least some control over the particular data stores from which data are accessed.

As shown for the purpose of illustration, a complete copy of the data set is in several of the illustrated data stores 706. However, as noted above, redundant storage of a data set may be more complex. Portions of the data set may be stored in different data stores 706. Similarly, portions of copies of the data set may be stored in different data stores 706. Partitions of a data set stored in different data stores may or may not correspond to partitions of a copy of the data set that are stored in different data stores. Generally, other variations of the environment 700 are considered as being within the scope of the present disclosure.

In addition, each of the clients 602 discussed above in connection with FIG. 6 may have multiple copies of a data set stored in accordance with the above description of FIG. 7. Further, the number of copies of each data set may vary for each data set. For example, if a first data set is accessed more often than a second data set, there may be more copies of the first data set stored than the second data set in order to handle the more frequent requests to access the first data set such as by distributing the requests among several data stores. In addition, a single data store 706 may include copies of data sets (or portions thereof) of multiple data sets.

Figure 8:
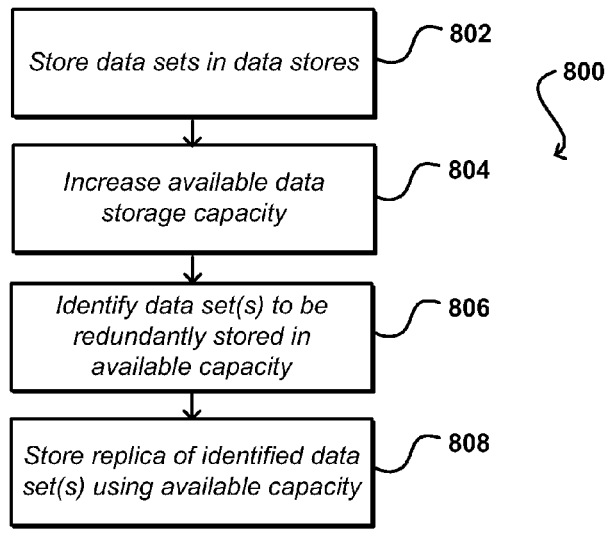
FIG. 8 illustrates an example process for utilizing capacity of a data storage system, in accordance with an embodiment.

As noted, data storage capacity of multiple data stores may be used to store redundant copies of data sets. In many instances, an organization, such as a remote computing services provider, may have excess storage capacity. Excess storage capacity may be maintained, for example, such as in order to accommodate future demand for storage from existing and/or new customers. Accordingly, FIG. 8 is a flowchart for an illustrative example of a process 800 that may be used in accordance with various embodiments described herein. Portions of the process 800 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium (or a collection of computer-readable storage media), for example, in the form of a computer program comprising a plurality of instructions executable by one or more processors.

In an embodiment, data sets are stored 802 in a plurality of data stores. The data sets may be stored such as in a manner described above, such as in connection with FIGS. 6 and 7 and/or FIG. 2. Further, storage of the data sets may include storage of one or more replicas of one or more of the data sets. In addition, storage of the data sets may include utilizing unused storage capacity of a collection of data stores of a data storage system for the replicas by storing replicas of the data sets. The replicas may occupy some or all of the excess capacity of a corresponding data storage system.

In an embodiment, available data storage capacity is increased 804. Increasing the data storage capacity may be performed in a variety of ways or combination of ways. For example, data storage capacity may be increased by adding one or more additional storage devices to a system of storage devices, such as depicted above in connection with FIGS. 6 and 7. A data manager, such as a data manager discussed above, may be reconfigured to direct requests to perform data operations to the new storage devices (or servers operating in connection therewith), as applicable. Other ways of increasing available storage capacity may also be used, including, but not limited to deallocating storage space allocated to a data set or copy thereof, applying one or more data compression algorithms to data, reallocating unused storage space from one or more data sets or copies thereof, and/or in other ways. Generally, any suitable way of increasing available storage capacity may be used.

In an embodiment, the additional available storage capacity is at least partially used to redundantly store data. Accordingly, as illustrated in FIG. 8, in an embodiment, one or more data sets to be redundantly stored using the available data storage capacity are identified 806. Identifying the one or more data sets may be performed in any suitable manner. For example, in an embodiment, the one or more data sets are identified so as to optimize the number of redundant copies of the data sets. One embodiment of how this may be accomplished is described in connection with FIG. 9, discussed below.

With the one or more data sets identified, in an embodiment, replicas of the one or more identified data sets are stored 808 using the available data storage capacity. For example, copies of the identified one or more data sets may be stored in one or more additional data stores that have been added to a data storage system. The copies of the identified one or more data sets may be used for backup, to increase performance, and/or for any suitable manner.

Figure 9:
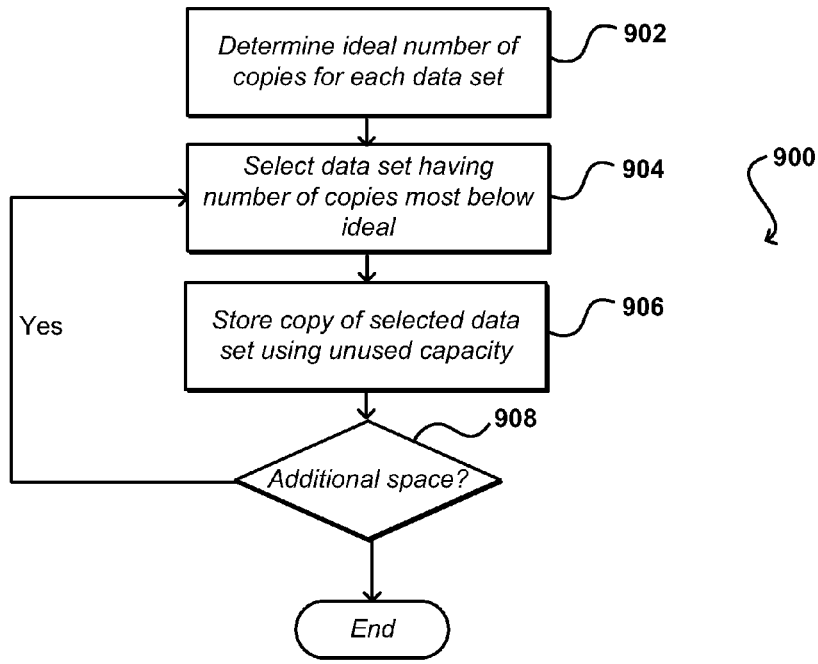
FIG. 9 illustrates an example process for optimizing the number of replicas of one or more data sets in a data storage system, in accordance with an embodiment.

As noted, FIG. 9 shows a flowchart of an illustrative example of a process 900 that may be used to identify one or more data stores of which copies may be stored using available capacity. Accordingly, the process shown in FIG. 9 or variations thereof may be, but are not necessarily, performed in connection with the process 800 described above, or variations thereof. Generally, all processes described and/or depicted in the present disclosure, and their variations, may be performed in combination.

In an embodiment, for a plurality of data sets, an ideal number of copies for each data set is determined 902. Determining an ideal number of copies may be performed in any suitable manner. The ideal number of copies of a data set may be based at least in part on predetermined threshold numbers, customer guarantees, rates at which data sets are accessed, other parameters and/or such parameters with respect to other data sets.

As noted above, replicas of data sets may be stored to improve read performance by distributing read operations among a plurality of data storage devices. In an embodiment, an ideal number of copies for a data set is determined based at least in part on characteristics of the data set relative to the same characteristics of other data sets. The characteristics may be, for example, based at least in part on data access rates, such as the rate at which data of a data set has been accessed (from the data set and/or a replica of the data set) over a period of time. Thus, if a data set is accessed approximately twice as often another data set, than the data set that is accessed twice as often, in an embodiment, would have approximately twice the number of copies of the other data set. Similar measures may also be used. For example, if two data sets are accessed at the same rate, operations for one on average take longer than the other (perhaps because the operations involve more data), the data set for which operations take longer may have an ideal number of copies that his higher than the other. Generally, any measure of performance with respect to data sets may be used in computing the ideal number of copies.

In addition, the ideal number of data sets may also depend on the total storage capacity of a data storage system and the size of the data sets stored in the data storage system. For instance, if a data storage system has a certain amount of memory, the number of copies of each data set that may be stored is limited by the amount of memory of the data storage system. A data storage system that stores small data sets would be able to store more copies of the data sets than a data storage system that stores larger data sets. As an example, if a system of data stores, such as the system described in connection with FIGS. 6 and 7, operates with a certain amount of storage capacity such that the ideal number of copies for one data set is five and the ideal number of copies for another data set is ten, and then the storage capacity is doubled, the ideal number of copies for the two data sets may become ten and twenty, respectively. Other parameters may be taken into account as well. For instance, depending on the rate at which a data set is accessed, additional copies may provide little or no additional performance benefit. As a specific example, if a data set already has enough copies stored throughout a system of data stores such that requests are always or nearly always immediately completed instead of being placed into a queue, adding additional data set copies may not significantly affect performance. Accordingly, the ideal number of copies of a data set may be based at least in part on upper limits, which may vary among data sets. Similarly, a minimum number of copies may be necessary for security reasons and, therefore, an ideal number of copies may be based at least in part on such a minimum number. This minimum may also vary among data sets and/or according to user requirements. Generally, the ideal number of copies for each data set may be determined in any suitable manner.

Further, determining 902 the ideal number of copies of a data set may, as with other actions described herein in connection with the present disclosure, be performed at any suitable time. For example, a computer system performing the process 902 may compute the ideal number of copies for each data set at a time that is temporally proximate to performance of other actions of the process 900, or at another time. For instance, the ideal number of copies may be computed and stored in a data store for a period of time before any action that is based at least in part on the ideal number of copies is taken.

In addition, it should be appreciated that the ideal number of copies of a data set need not be an integer value. As will be apparent, non-integer values may also be used. For example, an ideal number of copies of a data set may be three and a half, or any number. In this manner, as discussed below, comparing the redundancy needs for various data sets is more accurate than if only integer values were used.

In an embodiment, when the ideal number of copies for each data set is determined, a data set having a number of copies that deviates below its ideal by the greatest amount is selected 904. With a selected data set, in an embodiment, a determination is made 906 whether unused data storage capacity is able to accommodate a copy of the selected data set. The determination may be made, for example, by comparing the size of the data set with the amount of unused capacity. Other information may also be used, such as an additional amount of storage that may be required to store a copy of the selected data set and/or other data sets in the future as data sets may increase in size over time. In addition, a process of selecting the data set that has a number of copies that is less than its ideal number of copies may ignore data sets for which copies would be too large to store using the unused capacity, or may ignore data sets for other reasons.

A copy of the selected data set, in an embodiment, is stored 906 using the unused capacity. For example, if the unused capacity is due to an addition of at least one storage device, a copy of the selected data set may be stored using the additional storage device. A determination may also be made 908 whether, upon storing a copy of the selected data set, there would be enough remaining unused space to accommodate another copy of a data set. If there would not be enough unused space to accommodate an additional copy, the process 900, as illustrated, may end or other action not illustrated herein may be taken. If, however, the determination is that there would be enough additional space to accommodate another copy of a data set, a data set having a number of copies that deviates below its ideal by the most, as discussed above, may be selected 904. It should be appreciated that the same data set may be selected more than once, especially if the data set has a number of copies that differs from its ideal by a large amount relative to other data sets.

It should also be noted that, while determining whether the remaining unused space can accommodate another copy of a data set is shown for the purpose of illustration as being subsequent to storing a copy of the selected data set, the determination may be made before storing the copy of the selected data set since, in many embodiments, the size of the selected data set would be known and since such a calculation may be made without first storing a copy of the selected data set. Other variations are also possible, such as determining how many copies may be stored and selecting that many copies. Generally, the process 900 is illustrative and other variations may be used in the various embodiments.

As discussed, extra storage capacity may be used to store redundant copies of various data sets. Such may not be necessary, but excess storage capacity may be used in this manner because some benefit is achieved and the excess storage capacity would otherwise go unused. In many instances, the number of redundant copies of a data set that are maintained may be reduced without an excess amount of harm being done. Generally, the number of replicas stored in a system of data stores may be balanced with the need for storage space in a manner that does not excessively affect performance. In fact, in many instances, reducing the number of copies of a data set may be necessary, such as to make available free space for other data storage needs. Accordingly, FIG. 10 shows a flowchart for an illustrative example of a process 1000 that may be used to allocate storage space, in accordance with an embodiment.

As illustrated in the figure, in an embodiment, a request for a new storage volume is received 1002. The new storage volume may require an amount of storage capacity that may be provided, such as by a remote computing services provider, using one or more block level storage devices. The request for a new storage volume may be initiated in connection with provisioning resources for a customer of a remote computing services provider. The requested storage volume may be a virtual storage volume requested for use with one or more virtual machines to be operated on behalf of the customer. However, while various aspects of the present disclosure are discussed in connection with a remote computing service provider environment, the scope of the present disclosure is not limited to such. Indeed, various embodiments may be practiced in any environment where data sets are redundantly stored. Further, while FIG. 10 discusses an embodiment of the present disclosure in terms of a request for a new storage volume, the request may be any request for any resource that utilizes storage capacity. As one example, the request may be for additional capacity for an existing storage volume. In addition, the request may be for multiple storage volumes.

Figure 10:
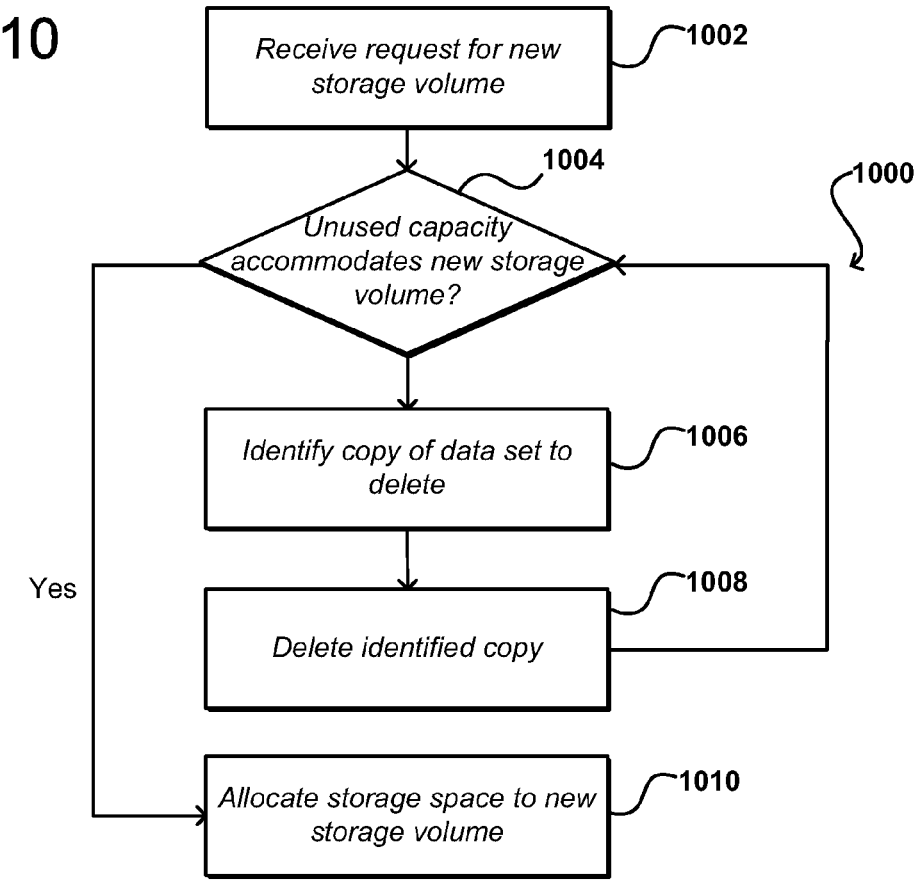
FIG. 10 illustrates an example process for accommodating a request for storage space, in accordance with an embodiment.

Returning to the illustrative example of FIG. 10, in an embodiment, in response to the request for a new storage volume, a determination is made 1004 whether the unused capacity in a system of data stores, such as a system having characteristics similar to those discussed above in connection with FIGS. 6 and 7, is able to accommodate the requested storage volume. The determination whether the system of data stores can accommodate the requested storage volume may be based at least in part on one or more parameters, such as a size of the requested storage volume, a minimum number of copies for the requested storage volume, anticipated future capacity needs for the requested storage volume or other storage volumes, and the like. As an example, the determination may be based at least in part on whether the amount of unused capacity is larger than the size of the requested storage volume. As another example, the determination may be based at least in part on whether the amount of unused capacity is larger than a multiple of size of the requested storage volume, the multiple corresponding to a number of copies required for the requested storage volume. For instance, if the requested storage volume is to have five hundred gigabytes allocated to it, a determination may be made whether the unused capacity is larger than one terabyte, which would accommodate the requested storage volume and one redundant copy of the requested storage volume, perhaps a minimum requirement to make sure at least one copy is available for backup or other purposes.

If the determination is that the unused storage capacity cannot accommodate the requested storage volume, in an embodiment, a copy of a data set is identified 1004 for deletion. A process for identifying copies for deletion may use, for instance, the process described below in connection with FIG. 11, although other processes may be used. In addition, variations of the process described below, or other processes may be used. For instance, old copies that are no longer used may be identified for deletion prior to other copies. Generally, any suitable process for identifying a copy of a data set to delete may be used.

In an embodiment, identifying a copy to delete involves identifying a data set and selecting from the copies of the data set one or more copies to delete. Various parameters may be used to identify the copy to delete. For instance, if a storage device has unused space, a copy that is stored on the storage device may be identified instead of another copy on another storage device with less unused space. As another example, one copy of a data set may be identified in a system as a primary copy that should not be deleted. The primary copy may be, for instance, a copy to which all write operations are directed, whereas read operations may be performed using other copies as long as the copies have the appropriate data for the read operations.

In an embodiment, the identified copy of a data set is deleted 1006. Deletion of the identified copy may be performed in various ways. For instance, data of the identified copy may be erased such that bytes of data of the identified copy are changed to no longer represent the data of the identified copy. As another example, storage space on a storage device may be deallocated so that the deallocated storage space is no longer accessible in connection with the data of the identified copy, except perhaps in the event of data recovery purposes. In this latter example, data of the identified copy may not be changed as part of the deletion, but may be later overwritten as part of another process.

Once the identified copy is deleted, in an embodiment, the determination whether the unused capacity will accommodate the requested storage volume is made 1004. This process of identifying and deleting copies of data sets may repeat until the determination is that the unused capacity will accommodate the requested storage volume. At this point, in an embodiment, space of the unused capacity is allocated 1010 to the new storage volume. If applicable, data may be written to the space allocated to the new storage volume.

As with all processes described herein, variations are considered as being within the scope of the present disclosure. For instance, as an alternative to repeatedly deleting and checking whether unused space can accommodate the requested storage volume, enough copies of one or more data sets may be identified and then collectively deleted. Because the size of data set copies may vary greatly among data sets, a variation on the process 1000 may be to identify a data set copy to delete, check to see if deletion will free enough space and, if it is not, then identifying another data set copy to delete, which may be of the same or a different data set.

As another example, various embodiments that utilize the process 1000 or variations thereof may identify and delete copies of data sets on multiple storage devices. Accordingly, such a process may also include rewriting copies of data sets to other storage devices in order to provide enough free space on a particular storage device so as to avoid having a data set partitioned among numerous storage devices. Similarly, one or more data sets or portions thereof may be moved from one data set to another in order to provide newly allocated space using several storage devices, such as to accommodate a new data set on one storage device and a replica of the new data set on another device. Generally, various other enhancements to the processes described herein may be used.

Figure 11:
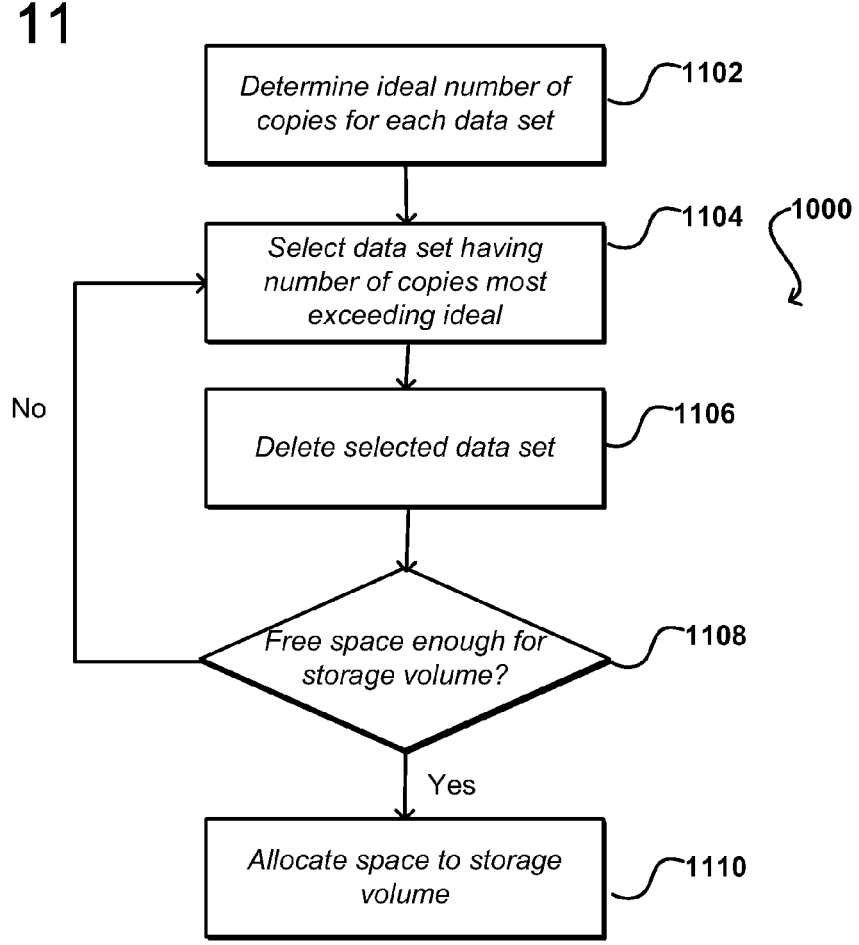
FIG. 11 illustrates an example process for optimizing the number of replicas of one or more data sets in a data storage system, in accordance with an embodiment.

As noted, FIG. 11 shows an illustrative example of a process 1100 for identifying a data set to delete, such as during performance of the process 1000 described above in connection with FIG. 10, or variations thereof. As with the process 1000, performance of the process 1100 illustrated in FIG. 11, or variations thereof, may be used in connection with an environment such as the environment described above in connection with FIGS. 6 and 7. As discussed, in such an environment, copies of data sets may be redundantly stored using a plurality of data stores. In an embodiment, the process 1100 illustrated in FIG. 11 includes determining 1102 an ideal number of copies for each data set. Determining an ideal number of copies for each data set may be performed in any suitable manner, including in ways discussed above.

In an embodiment, a data set having a number of copies that exceeds by the greatest amount its ideal number of copies is selected 1104 from the data sets. If no data set has a number of copies that is greater than its ideal number of copies, a data set that has a number of copies that deviates least from its ideal and that is less than its ideal may be selected in order to ensure that data sets having a number of copies already deviating the most from their ideal do not deviate further. As noted above, other parameters may be taken into account when selecting a data set.

A copy of the selected data set, in an embodiment, is deleted 1106. Deleting the copy of the data set may be performed in any suitable manner, such as described above. Further, while not shown in the figure, a copy from the copies of the data set may be selected using various criteria, as described above. In an embodiment, a determination is made 1108 whether, subsequent to a copy of the selected data set being deleted, unused space is enough for a storage volume to which space will be allocated. If it is determined that there is enough space, space may be allocated 1100 to a new storage volume, as described above. If it is determined that there is not enough space, then another data set (possibly the same data set) is selected and a copy of the selected data set is deleted, in accordance with the above description. As above, while FIG. 11 illustrates deleting a copy of a selected data set prior to determining whether the unused space will accommodate a storage volume, deleting multiple copies may be performed at another time and may be collectively performed as a single step in a variation of the process 1100. Other variations of the process 1100, including variations discussed above in connection with other figures, are also considered as being within the scope of the present disclosure, including variations described above, as applicable.

Figure 12:
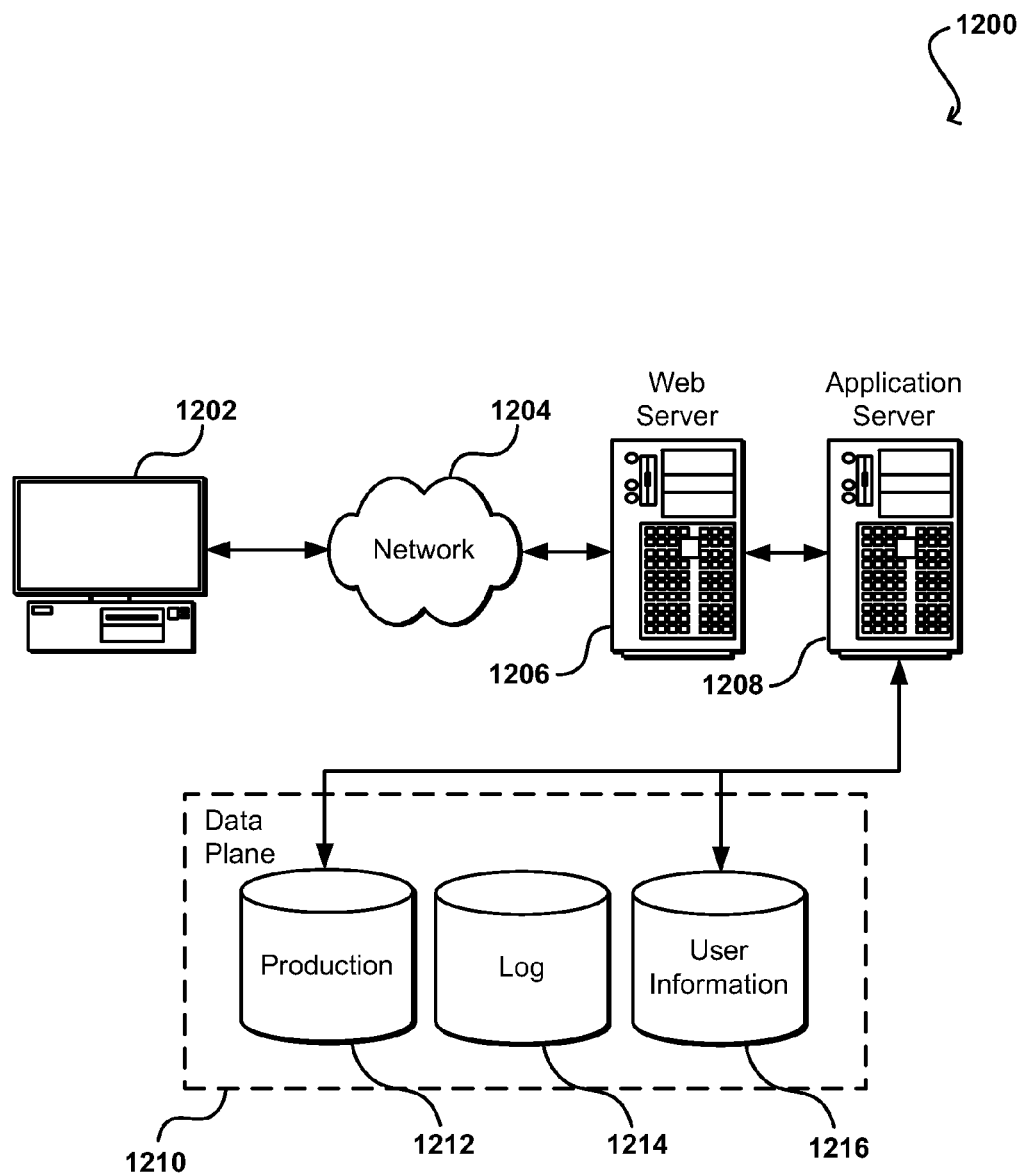
FIG. 12 illustrates an environment in which various embodiments can be implemented.

FIG. 12 illustrates an example of an environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIPS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for storing data, comprising:
    under the control of one or more computer systems configured with executable instructions,
        storing one or more copies of one or more data sets in a plurality of data stores, each of the data sets corresponding to a virtual storage volume and at least a particular data set of the one or more data sets having a plurality of copies;
        receiving a request to provision storage space to a new virtual storage volume;
        in response to the request, determining whether to reallocate storage space from one or more of the plurality of copies of the particular data set for the new virtual storage volume;
        in response to a determination to reallocate storage space, identifying one or more expendable copies from the plurality of copies based at least in part on a relative utilization metric of the one or more expendable copies, the utilization metric having been determined with respect to other copies in the plurality of copies, the relative utilization metric being based at least in part on a comparison of a frequency of access of the one or more expendable copies to a frequency of access of the other copies in the plurality of copies;
        deallocating at least some space allocated to the identified one or more expendable copies; and
        allocating the deallocated space to the new virtual storage volume.

2. The computer-implemented method of claim 1, wherein accessing different copies to respond to different read requests includes, for each read request of at least a plurality of the read requests, selecting, based at least in part on one or more performance indicators, at least one of the different copies to respond to the read request.

3. The computer-implemented method of claim 2, wherein selecting at least one of the different copies includes selecting a particular copy having a lowest number of items in a request queue and wherein, for the read request, accessing the different copies includes dispatching the read request to the selected particular copy.

4. The computer-implemented method of claim 2, wherein selecting at least one of the different copies includes selecting a particular copy determined to likely reduce read operation latency and wherein, for the read request, accessing the different copies includes dispatching the read request to the selected particular copy.

5. The computer-implemented method of claim 1, wherein identifying the one or more expendable copies includes selecting the one or more expendable copies based at least in part on one or more criteria.

6. The computer-implemented method of claim 5, wherein the one or more criteria are based at least in part on a number of copies for each of the identified one or more expendable copies.

7. The computer-implemented method of claim 1, wherein deallocating at least some space allocated to the identified one or more expendable copies includes erasing the identified one or more expendable copies.

8. A computer-implemented method for storing data, comprising:
    under the control of one or more computer systems configured with executable instructions,
        storing a plurality of copies of one or more data sets in a plurality of data stores, each of the one or more data sets corresponding to a virtual storage volume;
        receiving an instruction to allocate storage space for a different data set;
        identifying one or more expendable copies from the plurality of copies based at least in part on a relative utilization metric of the one or more expendable copies determined with respect to other copies in the plurality of copies, the relative utilization metric being based at least in part on a comparison of a frequency of access of the one or more expendable copies to a frequency of access of the other copies of the plurality of copies; and
        reallocating at least some of the space currently allocated to the identified one or more expendable copies to the different data set.

9. The computer-implemented method of claim 8, wherein at least a plurality of the one or more data sets each correspond to a different tenant of a remote computing services provider.

10. The computer-implemented method of claim 8, wherein the instruction to allocate storage space includes an instruction to provision a new virtual storage volume.

11. The computer-implemented method of claim 8, wherein the plurality of copies of the one or more data sets includes one or more redundant copies and wherein the method further comprises using the one or more redundant copies to respond to read requests.

12. The computer-implemented method of claim 8, wherein the one or more data sets comprises a plurality of data sets and wherein identifying the one or more expendable copies is based at least in part on one or more criteria for optimizing a number of copies of each of the plurality of data sets.

13. The computer-implemented method of claim 8, wherein the number of copies of each data set is based at least in part on a relative frequency of access of the data set with respect to the other copies of the plurality of copies.

14. The computer-implemented method of claim 8, wherein a target number of copies for each data set is determined based at least in part on a relative frequency of access of the data set with respect to the other copies of the plurality of copies and identifying the one or more expendable copies comprises identifying one or more of the plurality of copies that are in excess of the target number of copies.

15. The computer-implemented method of claim 14, wherein the one or more data sets includes a plurality of data sets each having a plurality of copies and identifying the one or more expendable copies further comprises determining one or more of the plurality of data sets having a number of copies that is most in excess of the target number of copies.

16. A computer-implemented method for storing data, comprising:
   under the control of one or more computer systems configured with executable instructions,
      storing a number of replicas of a data set in a plurality of data stores;
      determining to allocate storage space from one or more of the plurality of data stores to one or more data objects; and
      responsive to the determination to allocate storage space, reducing the number of replicas of the data set to accommodate allocation of the storage space for the one or more data objects in a manner that ensures that a determined minimum number of stored instances of the data set remain stored, wherein the reducing the number of replicas includes identifying an expendable replica from the number of replicas of the data set such that loss of the expendable replica does not reduce the number of stored instances of the data set below the determined minimum number, the expendable replica being identified based at least in part on a relative utilization metric of the expendable replica determined with respect to other replicas of the number of replicas, the relative utilization metric being based at least in part on a comparison of a frequency of access of the expendable replica to a frequency of access of the other replicas of the number of replicas.

17. The computer-implemented method of claim 16, wherein the data set corresponds to a virtual storage volume.

18. The computer-implemented method of claim 16, wherein the data set is from a collection of data sets having replicas stored in the plurality of data stores and wherein reducing the number of replicas includes selecting the data set from the collection of data sets.

19. The computer-implemented method of claim 18, wherein selecting the data set is based at least in part on one or more criteria for optimizing redundancy for each of the collection of data sets.

20. The computer-implemented method of claim 16, wherein the data object is a virtual storage volume.

21. One or more non-transitory computer-readable storage media having collectively stored thereon executable instructions that, when executed by one or more processors of a computer system, cause the computer system to at least:
   store a plurality of copies of one or more data sets in a plurality of data stores, each of the one or more data sets corresponding to a virtual storage volume;
   identify a need to allocate storage space;
   identify one or more expendable copies from the plurality of copies based at least in part on a relative utilization metric of the one or more expendable copies determined with respect to other copies of the plurality of copies, the relative utilization metric being based at least in part on a comparison of a frequency of access of the one or more expendable copies to a frequency of access of the other copies of the plurality of copies; and
   reallocate, in response to identification of the need to allocate storage space, at least some of the space currently used by the identified one or more expendable copies.

22. The one or more computer-readable storage media of claim 21, wherein at least a plurality of the one or more data sets correspond to different tenants of a remote computing services provider.

23. The one or more computer-readable storage media of claim 21, wherein the one or more data sets comprise a plurality of data sets and wherein identifying the one or more expendable copies includes selecting at least one most expendable redundant copy.

24. A system for storing data, comprising:
   one or more processors; and
   memory including executable instructions that, when executed by the one or more processors cause the one or more processors to collectively at least:
   store a number of replicas of a data set in a plurality of data stores;
   determine to allocate storage space from one or more of the plurality of data stores to one or more data objects; and
   responsive to the determination to allocate storage space, reduce the number of replicas of the data set to accommodate allocation of the storage space for the one or more data objects in a manner that ensures that a determined minimum number of stored instances of the data set remain stored, wherein the reducing the number of replicas includes identifying an expendable replica from the number of replicas of the data set such that loss of the expendable replica does not reduce the number of stored instances of the data set below the determined minimum number, the expendable replica being identified based at least in part on a relative utilization metric of the expendable replica determined with respect to other replicas of the number of replicas, the relative utilization metric being based at least in part on a comparison of a frequency of access of the expendable replica to a frequency of access of the other replicas of the number of replicas.

25. The system of claim 24, wherein the data set is from a collection of data sets having replicas stored in the plurality of data stores and wherein reducing the number of replicas includes selecting the data set from the collection of data sets.

26. The system of claim 25, wherein selecting the data set from the collection of data sets is based at least in part on a frequency of access for data corresponding to each of the collection of data sets.

\* \* \* \* \*